(12) United States Patent
Ingram et al.

(10) Patent No.: US 7,546,274 B2
(45) Date of Patent: Jun. 9, 2009

(54) SYSTEM AND METHOD FOR FACILITATING ELECTRONIC COMMERCE TRANSACTIONS AT AN AUTOMATIC TELLER MACHINE

(75) Inventors: Fraser R Ingram, Angus (GB); Craig N MacCallum, Stirling (GB); Gary T Neilson, Alloa (GB); Bryan Vincent Galvin, Alloa (GB); Anne Marie Milne, Alloa (GB); Craig William Strachan, Bannocuburn (GB); Alexander Ogilvie, Stirum (GB); Alexander John Haddow, Clackmannan (GB); Daniel G Cohen, Philadelphia, PA (US); Shami J Patel, Orinda, CA (US)

(73) Assignee: NCR Corporation, Dayton, OH (US)

( * ) Notice: Subject to any disclaimer, the term of this patent is extended or adjusted under 35 U.S.C. 154(b) by 1449 days.

(21) Appl. No.: 09/925,944

(22) Filed: Aug. 9, 2001

(65) Prior Publication Data

US 2003/0033249 A1  Feb. 13, 2003

(51) Int. Cl.
*G06Q 40/00* (2006.01)
(52) U.S. Cl. .......................................... 705/43; 705/42
(58) Field of Classification Search ................ 705/26, 705/40–43
See application file for complete search history.

(56) References Cited

U.S. PATENT DOCUMENTS

| | | | |
|---|---|---|---|
| 4,234,932 A * | 11/1980 | Gorgens | 235/379 |
| 4,317,957 A * | 3/1982 | Sendrow | 705/71 |
| 4,660,168 A * | 4/1987 | Grant et al. | 705/8 |
| 5,265,033 A | 11/1993 | Vajk et al. | |
| 5,305,195 A | 4/1994 | Murphy | |
| 5,473,143 A | 12/1995 | Vak et al. | |
| 6,085,177 A | 7/2000 | Semple et al. | |
| 6,973,442 B1 * | 12/2005 | Drummond et al. | 705/43 |
| 2001/0014881 A1 * | 8/2001 | Drummond et al. | 705/43 |
| 2002/0019781 A1 * | 2/2002 | Shooks et al. | 705/26 |
| 2002/0077977 A1 * | 6/2002 | Neely et al. | 705/40 |
| 2002/0138446 A1 * | 9/2002 | Antonin et al. | 705/67 |

OTHER PUBLICATIONS

TRM Corporation, "TRM Corporation buys UK ATM software developers for global e-commerce infrastructure expansion", May 10, 2000.
TRM Corporation, "iATMglobal.net Appoints Sahmi Patel To Lead New Company into e-commerce Venture", May 8, 2000.
TRM Corporation, "TRM Corporation Signs ATM Agreement with Cumberland Farms, Inc.", Mar. 23, 2000.
TRM Corporation, "TRM Corporation to Launch a New Internet Delivery Channel", Mar. 2, 2000.

* cited by examiner

*Primary Examiner*—Thu Thao Havan
(74) *Attorney, Agent, or Firm*—Priest & Goldstein PLLC

(57) ABSTRACT

A method and system facilitate an electronic commerce transaction between an ATM and an electronic commerce merchant via a global communications network. Transaction data is received at a server and verified with a processing network. The transaction data is reformatted, such that the data can be utilized by a server located on a global communications network, and transmitted over the global communications network to the servers of an electronic commerce merchant. Data is then received from the merchant, reformatted into a format that is capable of being utilized by the ATM, and transmitted back to the ATM.

27 Claims, 28 Drawing Sheets

FIG. 15A

```
1502 — <tag>
       <vendor name="yourdotcom.com">
1503 — <message id="card1">
1504 —   <header>
1505 —     <name/>
1506 —     <title>Please make your selection.</title>
         </header>
1507 —   <footer>
              www.yourdotcom.com
         </footer>

1508 —   <serverdata>
1509 —     <data>
1510 —       <name>ATMZIP</name>
1511 —       </value>
             <data/>
           </serverdata>

1512 —   <choice>
1513 —     <link>www.yourdotcom.com\gcvalue.asp</link>

1514 —     <label> $1 Gift </label>

1515 —     <data>
              <name>GCValue
              </name>
              <value>1</value>
              </data>
           </choice>
1516 —   <choice>
1517 —     <link>www.yourdotcom.com\gcvalue.asp</link>
1518 —     <label> $2 Gift</label>
1519 —     <data>
              <name>GCValue
              </name>

<value>2</value>
              </data>
           </choice>
         </message>
       </vendor>
```

```
<?xml version="1.0"?>
< version='1.0'>
<vendor name='vendorname'/>
<message id='messageid'>
  <header>
    <name>SELECTION PAGE</name>
    <timer>10</timer>
    <title>PLEASE MAKE YOUR SELECTION</title>
  </header>
  <choice>
    <link>www.selectionpage.com/firstpage.asp</link>
    <data>
      <name>
        CARDNUM
      </name>
      <value/>
    </data>
    <data>
      <name>
        phonenumber
      </name>
      <value/>
    </data>
    <data>
      <name>PIN</name>
    </data>
  </choice>
  <infotext><input name="phonenumber" type='text' format='N' minvalue='0' maxvalue='1000000' maxlength='9' isrequired='true' ></infotext>
</message>
</eraap>
```

FIG. 15C

For the above example the response expected assuming that a gift certificate of $1 was selected.

Using HTTP Get.

www.youdotcom\GCValue.asp?value=1 —————1520

Using HTTP Post. —————1522

<serverdata>
<link>http://www.yourdotcom\gcvalue.asp</ink/>
<data>
   <name>value</name>
   <value>1</value>
</data>
</serverdata>

Page requested from the Merchant and displayed on the ATM.

```xml
<?xml version="1.0" encoding="UTF-8"?>
< tag version="1.0">
    <vendor name="PHONECARD.COM"/>
    <message>
        <header>
            <name/>
            <title>PLEASE MAKE YOUR SELECTION</title>
        </header>
        <choice>
            <link>http://www.phonecards.com/selection.asp</link>
            <label>$10.00</label>
            <data>
                <name>value</name>
                <value>10</value>
            </data>
            <data>
                <name>CARDNAME</name>
            </data>
            <data>
                <name>CARDNUM</name>
            </data>

<data>
                <name>CARDEXP</name>
            </data>
        </choice>
        <choice>
            <link>http://www.phonecards.com/selection.asp</link>
            <label>$20.00</label>
            <data>
                <name>value</name>
                <value>20</value>
            </data>
            <data>
                <name>CARDNAME</name>
            </data>
            <data>
                <name>CARDNUM</name>
            </data>

<data>
                <name>CARDEXP</name>
            </data>
        </choice>
        <choice>
            <link>http//www.phonecards.com/selection.asp</link>
            <label>$30.00</label>
            <data>
                <name>value</name>
                <value>30</value>
            </data>
            <data>
                <name>CARDNAME</name>
            </data>
            <data>
                <name>CARDNUM</name>
            </data>

<data>
                <name>CARDEXP</name>
            </data>
        </choice>
    </message>
</tag>
```

FIG. 15G

Using HTTP Get.

http://www.phonecards.com/selection.asp?value=10

Using HTTP Post.

1524
```
<?xml version="1.0" encoding="UTF-8"?>
< tag>
<request>
    <data>
        <name>value</name>
        <value>10</value>
    </data>
</request>
</tag >
```

```
< tag version="1.0">
<vendor name="PHONECARD.COM"/>
<responsedata>
        <data>
                <name>DOTCOMTXNID</name>
                <value>87234873124</value>
        </data>
        <data>
                <name>TXNVALUE</name>
                <value>10</value>
        </data>
        <data>
                <name>ReceiptID</name>
                <value>98349098993</value>
        </data>
</responsedata>
<receipt>
THANK YOU FOR USING THIS ATM <BR/> YOUR UNIQUE ID IS <BR/>98349098993
< cut/> </receipt>
</tag>
```

FIG. 18B

```
    </card>

<card id="purchase">

<crt>

<p align=>"left" area="area1">

YOU HAVE SELECTED SENSE AND SENSIBILITY BY JANE AUSTIN
THE PRICE OF THIS BOOK IS $54.33. DO YOU ACCEPT OR
DECLINE.

</p>

<do type="fkey5" lable="< Decline">

<go href="#finish"/>

</do>

<do type="fkey4"  lable= Accept >">

<go href="
https://www.server.com/routing.asp?
atmserviceid=14&tagID=$(tagid)&TXNSERIALNUMBER=$(txnse
rialnumer)ATMSERVICEID=3&PWD=TBC_PASSWORD&LINK=https://w
ww.tag.amazonian.com/bookid=jass&TXNVALUE=54.33TXNCARD
NUM=$(cardnum)&TXNCARDEXP=$expdate)&TXNCARDNAME=$(cardna
me)"/>      </do>

</crt>

</card>

<card id="finish">

<exit/>         ~1813
    </card>

</tag>
```

FIG. 19

The following may then be returned from the server

```xml
<?xml version="1.0"?>
<!DOCTYPE raap>
<raap>
  <card>

<txnstatus dotcomtxnid="231231231"
txnserialnumber="4922" raaptxnid="1234567"
type="authorize"/>
    <crt>
      <p area="area1" align="center">
        PLEASE WAIT FOR YOUR RECEIPT
      </p>
    </crt>
    <rcpt>
      <p align="center">
        AMAZONIAN BOOKS CORP
      </p>
      <p align="left">
        PLEASE PRESENT THIS RECEIPT TO THE WAREHOUSE
        <br/>
        RECEIPT ID:023923782
      </p>
      <p align="left">
        <br/>
        <br/>
        <br/>
        PLEASE BUY ANOTHER BOOK
      </p>
    </rcpt>
  </card>
</raap>
```

- 1930 encompasses the entire XML
- 1932: txnstatus block
- 1936: crt paragraph block
- 1934: rcpt block

1937:
```
PLEASE WAIT FOR
YOUR RECEIPT
```

1936:
```
AMAZONIAN BOOKS CORP

PLEASE PRESENT THIS
RECEIPT TO THE
WAREHOUSE
RECEIPT ID: 023923782

PLEASE BUY ANOTHER
BOOK
```

SYSTEM AND METHOD FOR FACILITATING ELECTRONIC COMMERCE TRANSACTIONS AT AN AUTOMATIC TELLER MACHINE

FIELD OF THE INVENTION

The disclosed invention relates generally to methods and systems for facilitating electronic commerce transactions at an automatic teller machine.

DESCRIPTION OF THE BACKGROUND

Automatic teller machines (ATMs) have proliferated throughout the world. As the ATM worldwide population continues to grow, the average number of ATM transactions per ATM continues to drop. There is, therefore, a need to offer incentives to the population of ATM cardholders to make more use of ATMs and to offer owners, operators and deployers of ATMs additional sources of revenue to justify investment in ATMs. In addition, electronic commerce merchants continue to seek additional revenue opportunities and portals through which to offer their products and services.

SUMMARY OF THE INVENTION

The present invention addresses the needs apparent in the prior art by providing systems and methods for facilitating electronic commerce transactions between an ATM user and an electronic commerce merchant via a global communications network.

The present invention is directed to a method and system for facilitating an electronic commerce transaction between an ATM user and an electronic commerce merchant via a global communications network. ATM data, which includes transaction data, is received at one or more servers remote from the ATM and remote from one or more electronic commerce merchant servers. The transaction data is reformatted, at the remote server(s), into a first format that enables the transaction data to be utilized by a server located on a global communications network. The reformatted transaction data is transmitted over the global communications network to the electronic commerce merchant server(s) from the remote server(s). Merchant data (generated by the electronic commerce merchant server(s) in response to the reformatted transaction data) is received from the electronic commerce merchant at the remote server(s). The merchant data is reformatted at the remote server(s) into a second format that enables the merchant data to be utilized by the ATM. The ATM is able to utilize the merchant data without using a browser. The reformatted merchant data is transmitted to the ATM from the remote server(s).

The present invention is also directed to a method and system for facilitating communication of information via a global communications network related to an electronic commerce transaction between an ATM and a server of an electronic commerce merchant. First transaction data is received from the electronic commerce merchant at a first server in a first format. The first transaction data is capable of being utilized by a server located on the global communications network. The first transaction data is reformatted, which includes adding to the first transaction data one or more message tags. The message tags instruct the ATM to perform one or more functions relating to the electronic commerce transaction. The reformatted first transaction data is transmitted to the ATM. The reformatted first transaction data is capable of being utilized by the ATM, without use of a browser.

The present invention is further directed to a method and system for facilitating an electronic commerce transaction occurring over a global communications network between an electronic commerce merchant and a user of an ATM. The ATM is capable of utilizing data relating to the transaction without use of a browser. The ATM includes a display screen and one or more keys for indicating a selection relating to the transaction. Offer data associated with the transaction is formatted for presentation at the ATM. The formatting includes adding one or more card tags to the data, associated with one or more cards. The card tags facilitate display of transaction information on the display screen and specify content information and layout information. The formatting also includes adding a navigation tag to the data. The navigation tag facilitates navigation within cards, between cards or within the global communications network. The navigation tag further specifies key identification information and key linking information. The formatting further includes modifying an input tag associated with the data. The input tag facilitates acceptance of one or more input variables from the user and specifies variable identification information and variable format information.

BRIEF DESCRIPTION OF THE DRAWINGS

The accompanying drawings, wherein like reference numerals are employed to designate like parts or steps, are included to provide a further understanding of the invention, are incorporated in and constitute a part of this specification, and illustrate embodiments of the invention that together with the description serve to explain the principles of the invention.

In the drawings:

FIG. 15A illustrates reformatted data used to display information on an ATM screen in accordance with a preferred embodiment of the present invention.

FIG. 15C illustrates reformatted data used to display information on an ATM screen in accordance with a preferred embodiment of the present invention.

FIG. 15D illustrates reformatted data communicated from an ATM.

FIG. 15E illustrates reformatted data used to display information on an ATM screen in accordance with a preferred embodiment of the present invention.

FIG. 15G illustrates reformatted data communicated from an ATM.

FIG. 15H illustrates reformatted data representing an exemplary response to the data illustrated in FIG. 15G.

FIGS. 18A and 18B illustrate reformatted data used to display information on an ATM screen in accordance with a preferred embodiment of the present invention.

FIG. 19 illustrates reformatted data used to display information on an ATM screen in accordance with a preferred embodiment of the present invention.

DETAILED DESCRIPTION

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements.

Figure 1A:
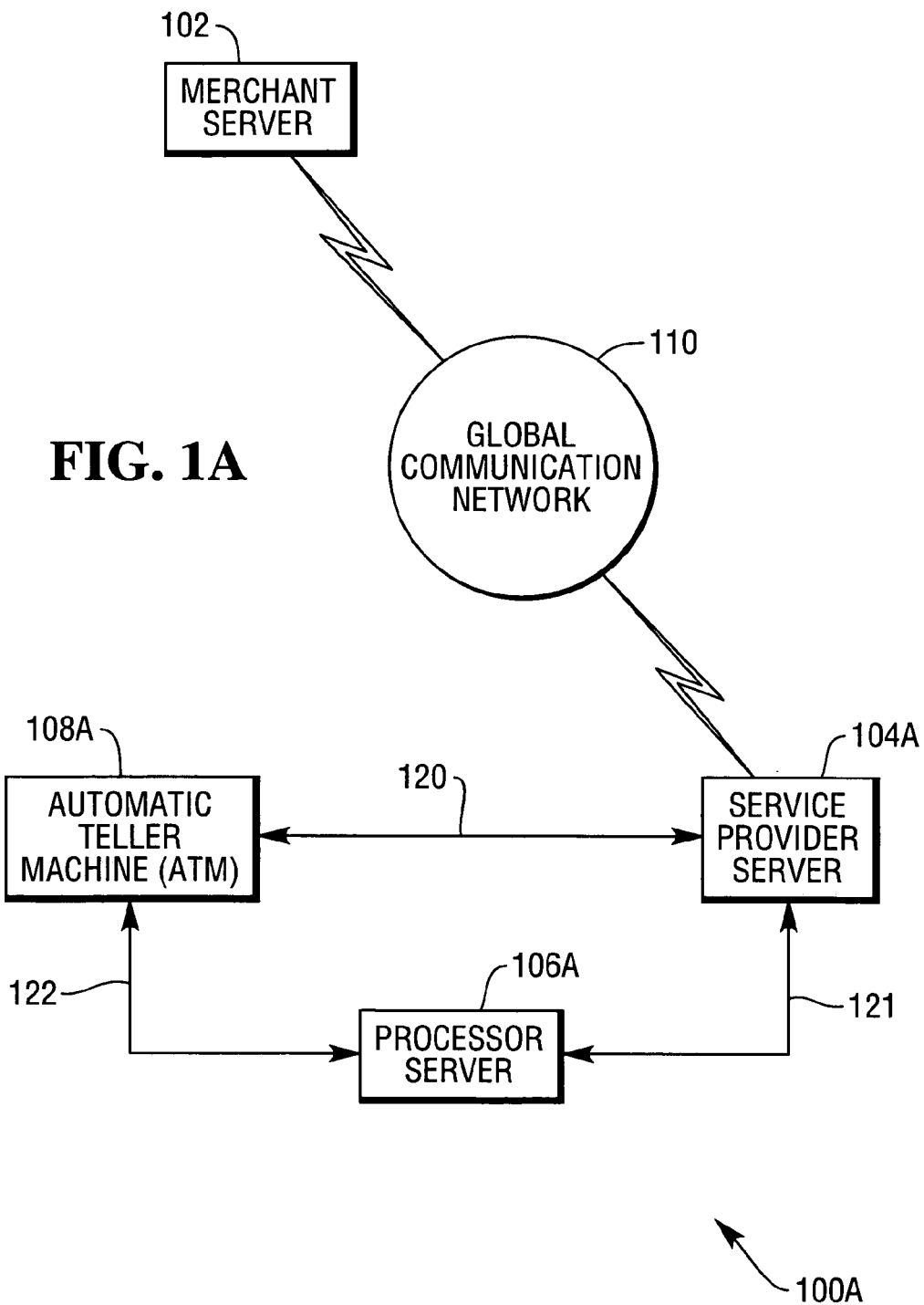
FIG. 1A illustrates a preferred embodiment of a system for carrying out the methods of the invention.

FIG. 1A depicts an exemplary embodiment of a system 100A for implementing the methods of a preferred embodiment of the present invention. The system comprises one or more ATMs 108A, one or more processor servers 106A, one or more service provider servers 104A, and one or more merchant servers 102 of one or more electronic commerce merchants. Service provider server 104A communicates with merchant server 102 via the global communications network 110, which is, for example, the Internet. Further, in some embodiments, service provider server 104A communicates directly with ATM 108A over network link 120 and with processor server 106A over network link 121 using, for example, a modem. In alternative embodiments, service provider server 104A does not communicate with ATM 108A directly and, instead, communicates with ATM 108A only through processor server 106A (which may be, in some embodiments, a proprietary bank network such as a Base 24 system or other similar system) over network links 121 and 122. The servers referred to herein may include any devices that serve information to and receive information from computers that connect to them.

Figure 1B:
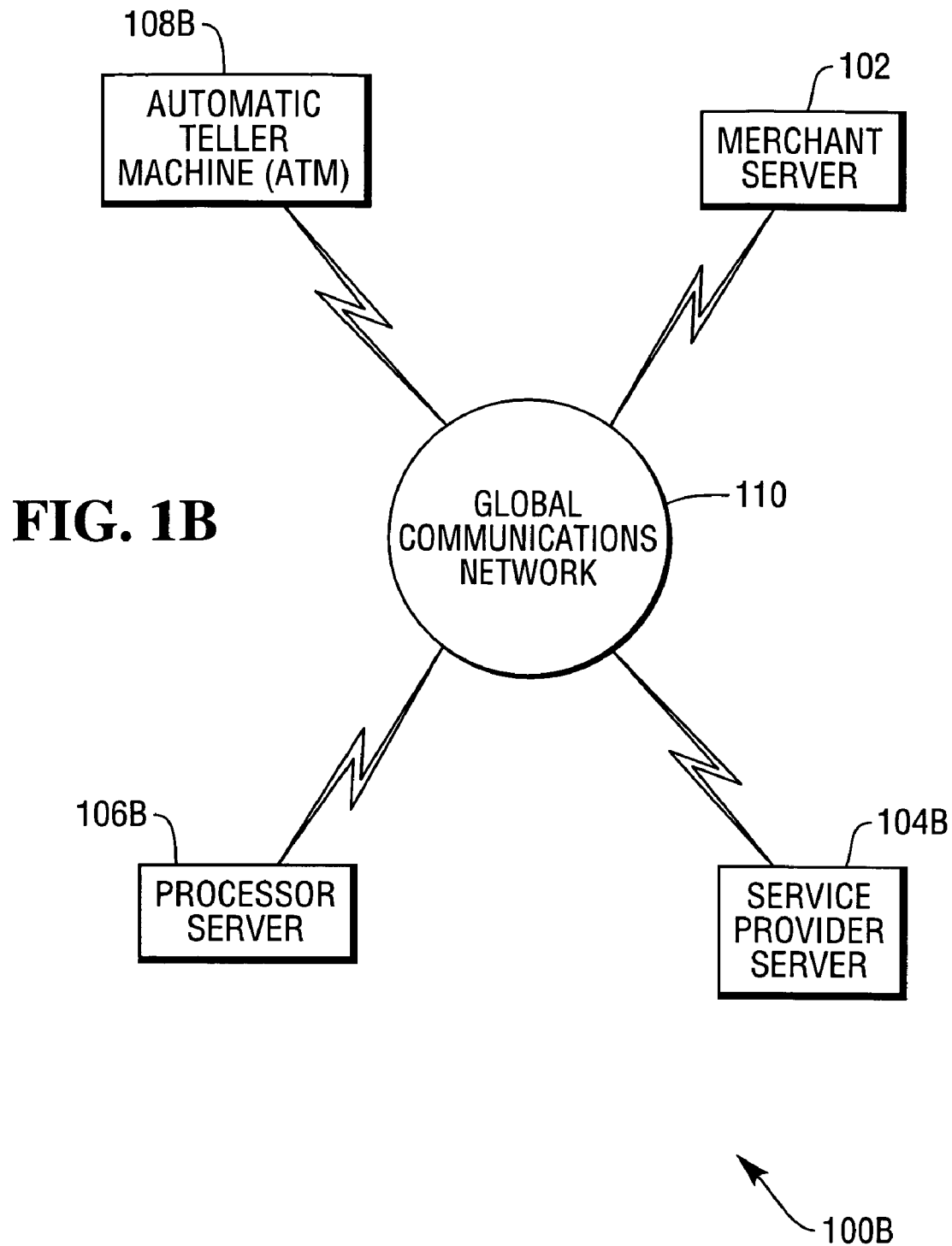
FIG. 1B illustrates a preferred embodiment of a system for carrying out the methods of the invention.

FIG. 1B depicts an alternative exemplary embodiment of a system 100B for implementing the methods of a preferred embodiment of the present invention. The system comprises one or more ATMs 108B, one or more processor servers 106B, one or more service provider servers 104B, and one or more merchant servers 102 of one or more electronic commerce merchants, each connected to and communicating with each other via the global communications network 110 (for example, the Internet).

The ATMs 108A and 108B in these embodiments accommodate a user who desires to make an inquiry of or a purchase from an electronic commerce merchant. The electronic commerce merchant is any provider or offeror of goods or services, or one who hosts the offering of goods or services of another, that is capable of conducting business over the global communications network 110 using merchant server 102, either through a web site or otherwise.

The service provider server 104A or 104B is remote from the ATM 108A or 108B and remote from the merchant server 102, meaning that service provider server 104A and 104B does not occupy the same physical or virtual space as the ATM 108A or 108B or merchant server 102. In other embodiments, however, service provider server 104A or 104B is not necessarily remote from the ATM 108A or 108B and/or the merchant server 102. The software residing on service provider server 104A or 104B or on ATM 108A or 108B facilitates transactions among an ATM user who enters and receives information at the ATM 108A or 108B, the merchant that receives and provides information through merchant server 102, and a processing network (e.g., a verification institution such as VeriSign or a financial institution such as a bank, credit union or credit card company) that receives and provides information through processor server 106A or 106B. In the preferred embodiment, this software includes one or more of the following components to implement such transactions: an XML parser, Internet interface software, encryption software, and ATM interface software. The XML parser converts XML formatted data into ATM displayable data. While the preferred embodiments are described herein with reference to XML, it will be recognized that the data converted into ATM displayable data in accordance with the present invention may be in any format that enables such data to be utilized by a server located on a global communications network, such as the Internet. The Internet interface software allows interactive communications between the service provider server 104A or 104B and the global communications network 110. The encryption software provides for the secure transmission of data between the service provider server 104A or 104B and the ATM 108A or 108B. The ATM interface software controls the devices on the ATM 108A or 108B, such as the display, keyboard, and printer. Additional functionality may be included in some embodiments.

The service provider server 104A or 104B may, in some embodiments, conduct checks to ensure that all ATMs 108A or 108B and merchant servers 102 within system 100A or 100B are registered. Service provider server 104A or 104B may also conduct security checks, which will be known to those skilled in the art. In the event there arises a need to add one or more ATMs 108A or 108B or merchant servers 102 to the system 100A or 100B, the service provider server 104A or 104B may perform this function. Similarly, as one or more ATMs 108A or 108B or merchant servers 102 disassociate with a system such as system 100A or 100B, the service provider server 104A or 104B may promptly remove them from the system 100A or 100B, thereby preventing unauthorized transactions involving these disassociated entities. Service provider server 104A or 104B may also maintain a record of transaction data to be used for, among other things, reconciliation and settlement activities.

As typical ATMs cannot interpret XML or HTML, the programming language currently used to create pages hosted on the World Wide Web, software (e.g., the XML parser) residing at the service provider server 104A or 104B reformats the data provided by the merchant server 102 such that the data can be presented to the user at the ATM 108A or 108B. The preferred embodiments of a method for reformatting this data is described in more detail with reference to FIGS. 15-19. In addition, a typical ATM cannot process large quantities of data at one time. Given that the typical electronic commerce transaction carried out, for example, at a personal computer involves processing significant quantities of data, the service provider server 104A or 104B may select for reformatting and presentation at the ATM 108A or 108B only a subset of the information provided by the merchant server 102.

Figure 2:
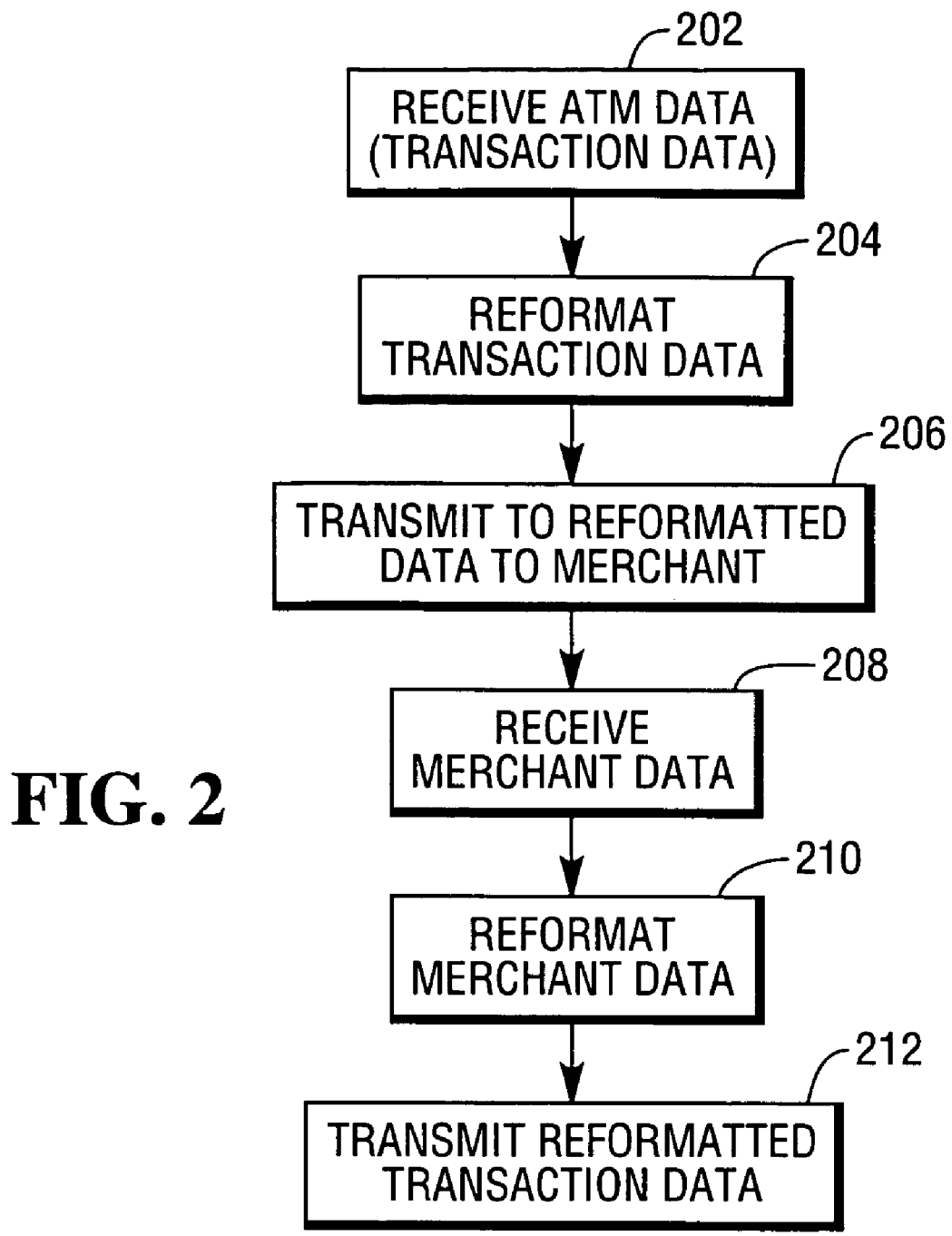
FIG. 2 is a flow chart illustrating a preferred embodiment of a method of facilitating an electronic commerce transaction between an ATM and an electronic commerce merchant via a global communications network.

FIG. 2 is a flow chart that illustrates a preferred embodiment of a method of facilitating an electronic commerce transaction between an ATM user and an electronic commerce merchant via a global communications network in accordance with a preferred embodiment of the present invention. In particular, FIG. 2 describes the flow of data between the ATM user and the electronic commerce merchant during a transaction.

In step 202, data (including data relating to the transaction) is transmitted from the ATM 108 over network link 120 or global communications network 110 and received at the service provider server 104A or 104B shown in FIGS. 1A and 1B, respectively. In step 204, the transaction data is reformatted at the service provider server 104 into a first format that allows such data to be utilized by a server located on global communications network 110 (such as XML). In step 206, the reformatted transaction data is transmitted over the global communications network 110 to the merchant server 102 from the service provider server 104A or 104B. In step 208, merchant data generated in response to the reformatted transaction data is received at the service provider server 104A or 104B. In step 210, the merchant data is reformatted at service provider server 104A or 104B such that it is capable of being utilized by the ATM 108A or 108B. In step 212, the reformatted merchant data is transmitted from the service provider server 104A or 104B to the ATM 108A or 108B over network link 120 (or through processor server 106A via network links 121 and 122) or the global communications network 110.

Figure 3A:
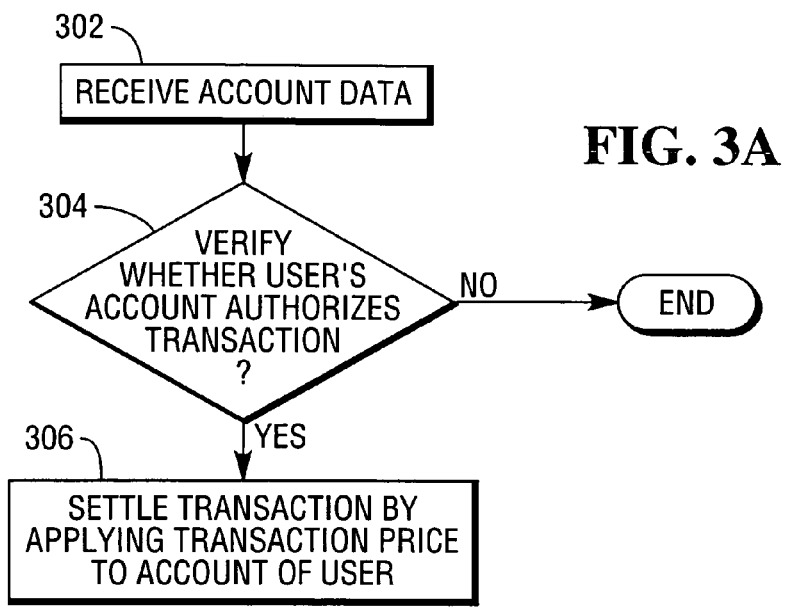
FIG. 3A is a flow chart illustrating the flow of transaction finds in accordance with a preferred embodiment of the present invention.

In the event the ATM user engaged in a transaction at ATM 108A or 108B has decided to make a purchase, with an associated transaction price, there are several ways in which payment for the purchase can be processed in accordance with the invention. FIG. 3A is a flow chart illustrating a preferred embodiment of a method for processing payment for the purchase. This embodiment relates to transactions that do not involve a personal identification number ("PIN"), such as some credit transactions. In step 302, account data inputted by the user at ATM 108A or 108B (by, for example, inserting or swiping a card) is received by, for example, service provider server 104A or 104B. In step 304, whether the user's account authorizes the transaction is verified with a processing network, for example, processor server 106A or 106B. Upon verifying that the user's account authorizes the transaction, the transaction is settled in step 306 by applying the transaction price to the account of the user.

In a particular example, in the case of a credit card transaction, the electronic commerce merchant may receive the user's account data and verify with a credit card company that the user's account authorizes the transaction. In that case, the transaction is settled between the credit card company and the electronic commerce merchant. Alternatively, in the case of a credit card transaction, transaction facilitator (such as the service provider) may verify with a credit card company or with an entity that performs credit verification services that the user's account authorizes the transaction. In that case, the transaction is settled between the facilitator and the credit verification entity.

Figure 3B:
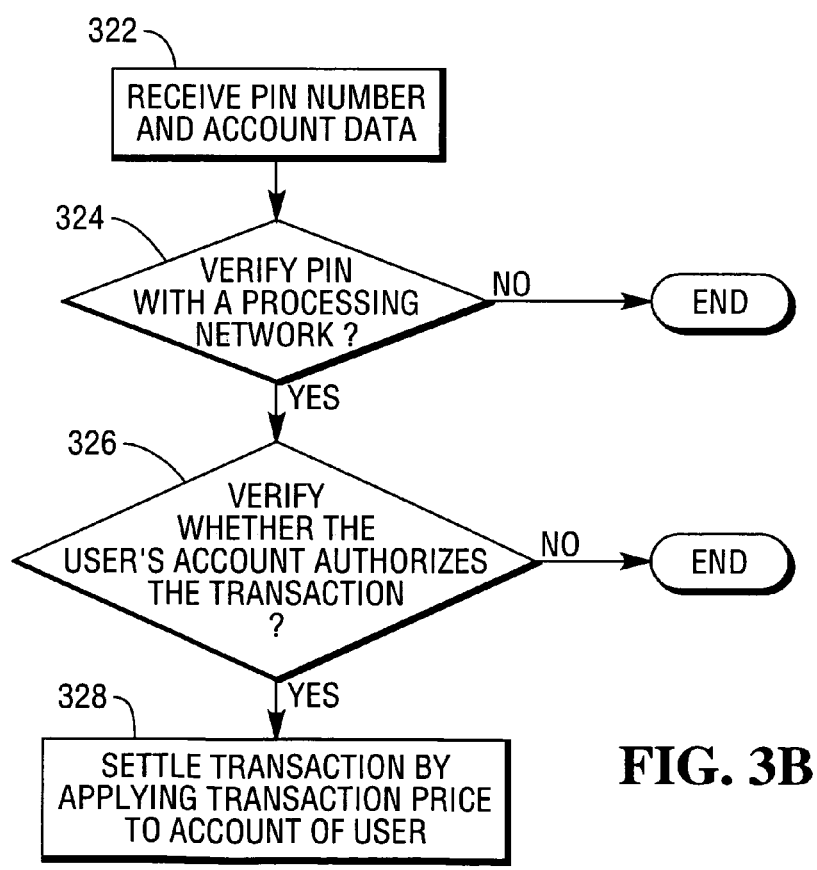
FIG. 3B is a flow chart illustrating the flow of transaction finds in accordance with a preferred embodiment of the present invention.

FIG. 3B is a flow chart illustrating another preferred embodiment of a method of processing payment for the purchase. This embodiment relates to transactions that are PIN-based. In step 322, account data and data associated with a PIN inputted by the user at the ATM 108 are received by, for example, service provider server 104A or 104B. In step 324, the PIN data is verified with a processing network. In step 326, whether the user's account authorizes the transaction is verified with the processing network. In some embodiments, step 324 and 326 may be performed in one step. Upon verifying the PIN data and that the user's account authorizes the transaction, the transaction is settled in step 328 by applying the transaction price to the account of the user. In a particular example, in the case of a PIN-based debit transaction, a facilitator of the transaction (such as the service provider) may verify the PIN data with a financial institution (e.g., a bank or credit union). In that case, the transaction is settled between the facilitator and the financial institution.

The verification steps described above include, but are not necessarily limited to: verifying that the PIN data entered is correct for the card entered; verifying that the card is valid; verifying that the card has not been reported stolen or cancelled; and verifying that the account with which the user intends to associate a transaction is enabled for that transaction. As described above, the verification may be performed by a financial institution (such as a bank, credit union or credit card company) or some other verification service (such as VeriSign).

Figure 4:
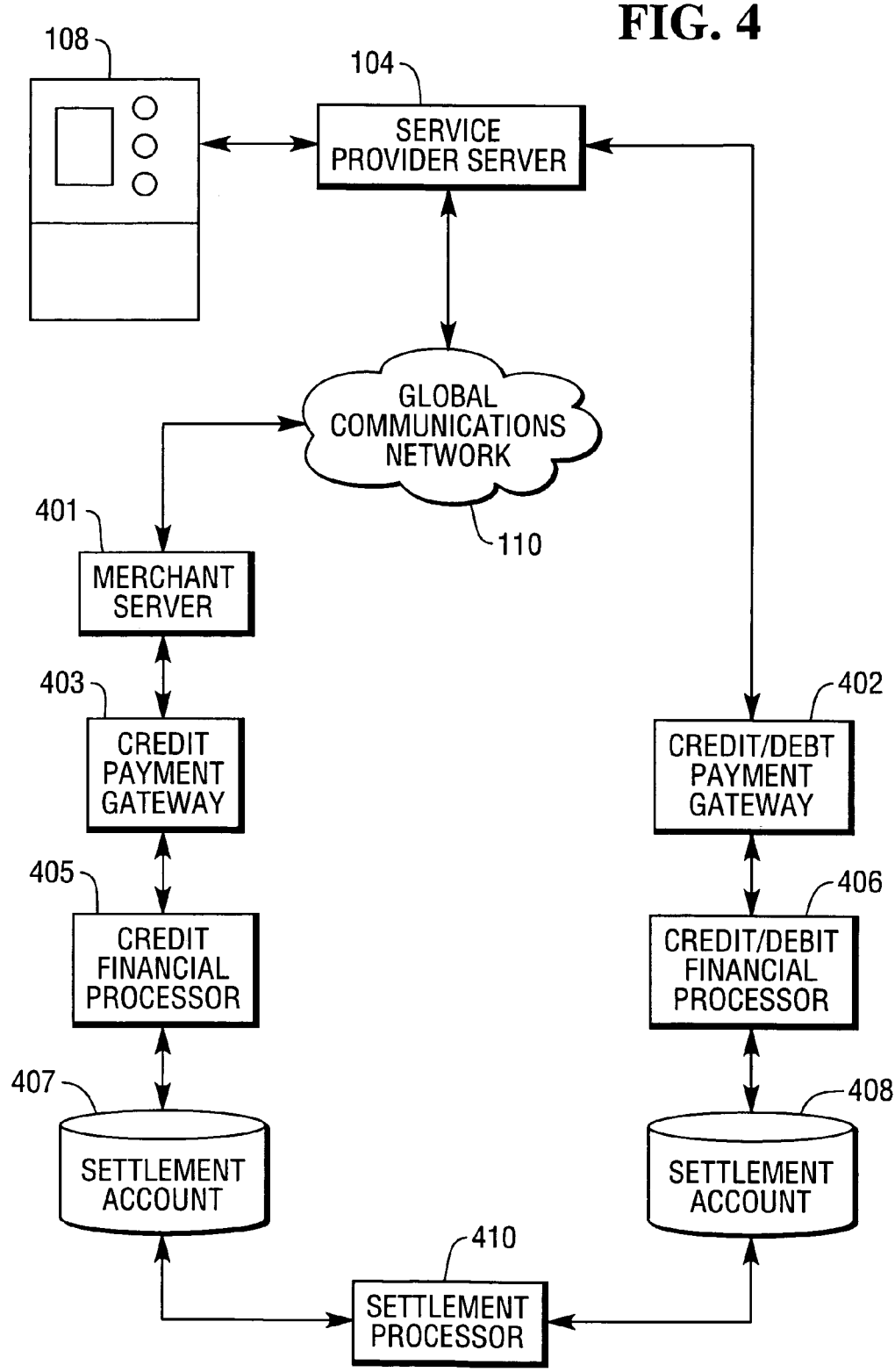
FIG. 4 illustrates a preferred embodiment of a system that supports transaction finds flow.

FIG. 4 illustrates one embodiment of a system for supporting the flow of transaction funds for a number of different types of transactions. In some embodiments, the transaction facilitator and the merchant have agreed that non-PIN based credit transactions will be processed by the merchant. In this case, data obtained from the user at ATM 108 (including the user's credit card account information, the user's choice of product or service, and a transaction price associated with the purchase) is transmitted to service provider server 104 (also shown as 104A and 104B of FIGS. 1A and 1B). Service provider server 104 reformats the data and transmits it to merchant server 401 (also shown as merchant server 102 of FIGS. 1A and 1B) over global communications network 110. In order to verify that the user's account authorizes the transaction, merchant server 401 communicates through credit payment gateway 403 with credit financial processor 405 (e.g., a credit card company). Assuming the user's account authorizes the transaction, credit financial processor 405 communicates this authorization to merchant server 401 through credit payment gateway 403. Credit financial processor 405 also records the transaction against the user's account in settlement account database 407. Settlement processor 410 settles the transaction among the user, the merchant and the credit institution in accordance with procedures that will be known to those skilled in the art.

In other embodiments, the transaction facilitator and the merchant have determined that credit transactions will be processed without involvement by the merchant and, further, that PIN-based debit transactions will be processed without involvement by the merchant. In these cases, data obtained from the user at ATM 108 (such data including the user's credit/debit card account information, data associated with a PIN, the user's choice of product or service, and a transaction price associated with the purchase) is transmitted to service provider server 104 (also shown as 104A and 104B of FIGS. 1A and 1B). In order to verify that the user's account authorizes the transaction, service provider server 104 communicates through credit/debit payment gateway 402 with credit/debit financial processor 406. If the transaction is a PIN-based debit transaction, the credit/debit financial processor 406 may be part of a banking network that verifies the PIN data and that the user's account authorizes the transaction. Assuming the PIN data can be verified and user's account authorizes the transaction, credit/debit financial processor 406 communicates this authorization to service provider server 104 through credit/debit payment gateway 402. Service provider server 104 then presents the pre-authorized transaction to merchant server 401, which then continues to process the transaction. If the transaction is a credit non-PIN based transaction, the credit/debit financial processor may be a credit card company or third party credit verification institution that verifies that the user's account authorizes the transaction (the PIN data being discarded in most cases as unnecessary). Assuming the user's account authorizes the transaction, credit/debit financial processor 406 communicates this authorization to service provider server 104 through credit/debit payment gateway 402. Service provider server 104 then presents the pre-authorized transaction to merchant server 401, which then continues to process the transaction. Credit/debit financial processor 406 records the transaction against the user's account in settlement account database 408. Settlement processor 410 settles the transaction among the user, the merchant, the bank/credit card company in accordance with procedures known to those skilled in the art.

While the user may place an order during the transaction (in which case order information is transmitted from the ATM 108 and order confirmation and receipt data is returned from the merchant), the user may also simply make an inquiry relating to the transaction. For example, a user of an ATM that purports to offer movie ticket information may inquire at the ATM as to which movies are playing, where, when and at what price. In this embodiment, the user may or may not actually purchase the movie tickets from the ATM. In still other embodiments, the transaction data transmitted from the ATM is location information. For example, a user of the same ATM may enter at the ATM location information, such as a zip code. In response, the ATM may provide the user with movie options at theatres proximate the location entered by the user. In other embodiments, location information of the ATM is preprogrammed into the ATM or, alternatively, maintained at service provider server. As in the previous example, the user may only be seeking information, and may or may not purchase movie tickets through the ATM.

The electronic commerce transaction options that are presented at the ATM may be the same for all users in all cases or may, in some embodiments, vary depending on a number of factors. For example, the selections presented to the ATM user may be determined in response to some action taken by the ATM user, such as a particular selection made by the user. In another embodiment, the offer presented to the ATM user may be specific to the type of card the user inserts at the ATM. For example, where a card user receives "points" for making purchases with his or her card, the offer presented may relate to a conversion of points accrued on the card into goods or services. In another example, certain cards may be limited either by the goods or services that can be purchased with the card or by the amount of money that can be charged against the card, such as may be the case of a card given to a child by its parent.

The merchant data presented to the ATM user at any point in the process may be data that is received from the merchant server 102 in real time as the transaction is unfolding or may be data previously received from the merchant server 102 and cached at the server provider server 104A or 104B. For example, certain data presented to the ATM user may be the same for a number of different types of transactions and does not change based on the user's selection. Such static data may be downloaded periodically (for example, in the evening) by the service provider server 104A or 104B from merchant server 102 and maintained at service provider server 104A or 104B pending presentation at ATM 108A or 108B. An example of static data is the name of a movie being shown at a particular theatre. Other data presented to the user of ATM 108A or 108B may change based on the user's selections and other inputs. Such dynamic data is retrieved from the merchant server 102 by service provider server 104A or 104B in real time as the transaction unfolds. One example of dynamic data is current seating availability for a particular movie chosen by a user. One advantage of this embodiment is that the static data is readily available for presentation to the user at ATM 108A or 108B without any time delay necessitated by having to retrieve data from merchant server 102.

The electronic commerce offers presented to users and the merchant data received in response to the user's selection at the ATM may be different from the electronic commerce offers and data presented to users of the merchant's web site, if any, for a variety of reasons. First, service provider server 104A or 104B accesses the merchant data through the "back door" to the merchant's web site. As noted elsewhere herein, some of this data is stripped prior to reformatting and display at the ATM 108A or 108B. In addition, any advertising presented to the ATM user by the merchant may be different from advertising presented to users of the merchant's web site, if any.

The methods and system illustrated with reference to FIGS. 1A, 1B, 2, 3A, 3B, and 4 may be used to support many types of transactions between an ATM user and an electronic commerce merchant. All such transactions are within the scope of the present invention. The following describes some specific exemplary embodiments of the same.

EXAMPLE 1

Prepaid Long Distance Telephone Charges

Figure 5:
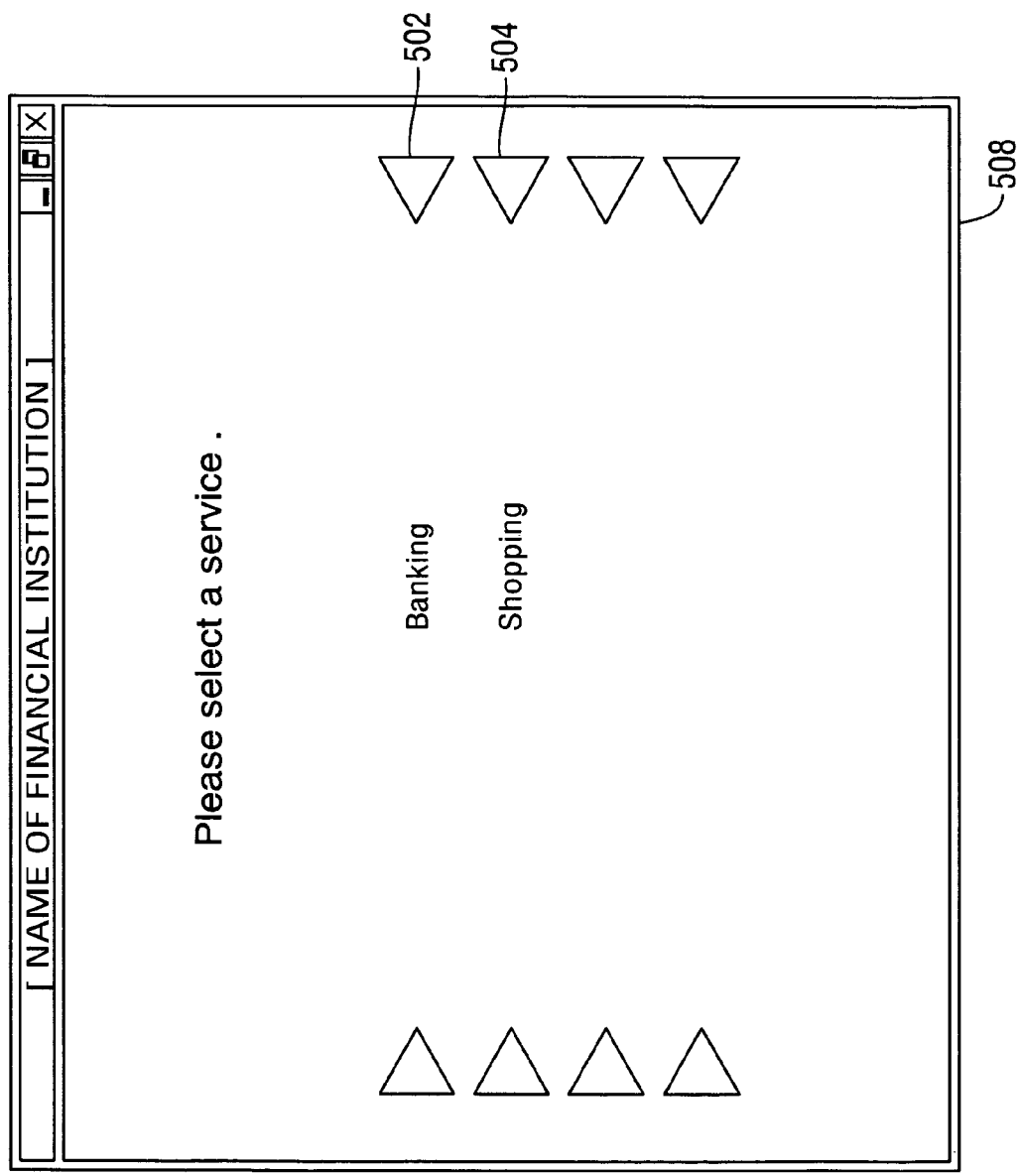
FIG. 5 illustrates an exemplary ATM screen display.

One exemplary embodiment in which the methods and systems of the present invention may be implemented involves a transaction between an ATM user and a merchant that sells prepaid long distance telephone service. In this example, the ATM user inserts her card into an ATM machine. The card may be a credit or a debit card. The ATM user may be presented with several options on the ATM screen. As illustrated in FIG. 5, the user may select a banking option by pressing the "Banking" key 502 on ATM screen 508. Alternatively, the user may select an electronic commerce option by pressing, for example, the "Shopping" key 504. In some embodiments, the user may not have to insert her card unless the user selects the "Banking" option or unless the user indicates her desire to make a purchase. When the "Shopping" key 504 is selected, the user is presented with list of products and services that are available from various electronic commerce merchants, such as those supported by merchant server 102 of system 100A or 100B. In some cases, the products and services available to the user may be limited, based on, for example, the user's card. For example, a mother may give her son a card that enables only the purchase of prepaid long distance charges and, then, only for amounts not exceeding $20. Thus, in this example, the son may not be presented with the option of prepaying for long distance in an amount that exceeds $20, or for that matter, to purchase movie tickets as described in Example 2.

Figure 6:
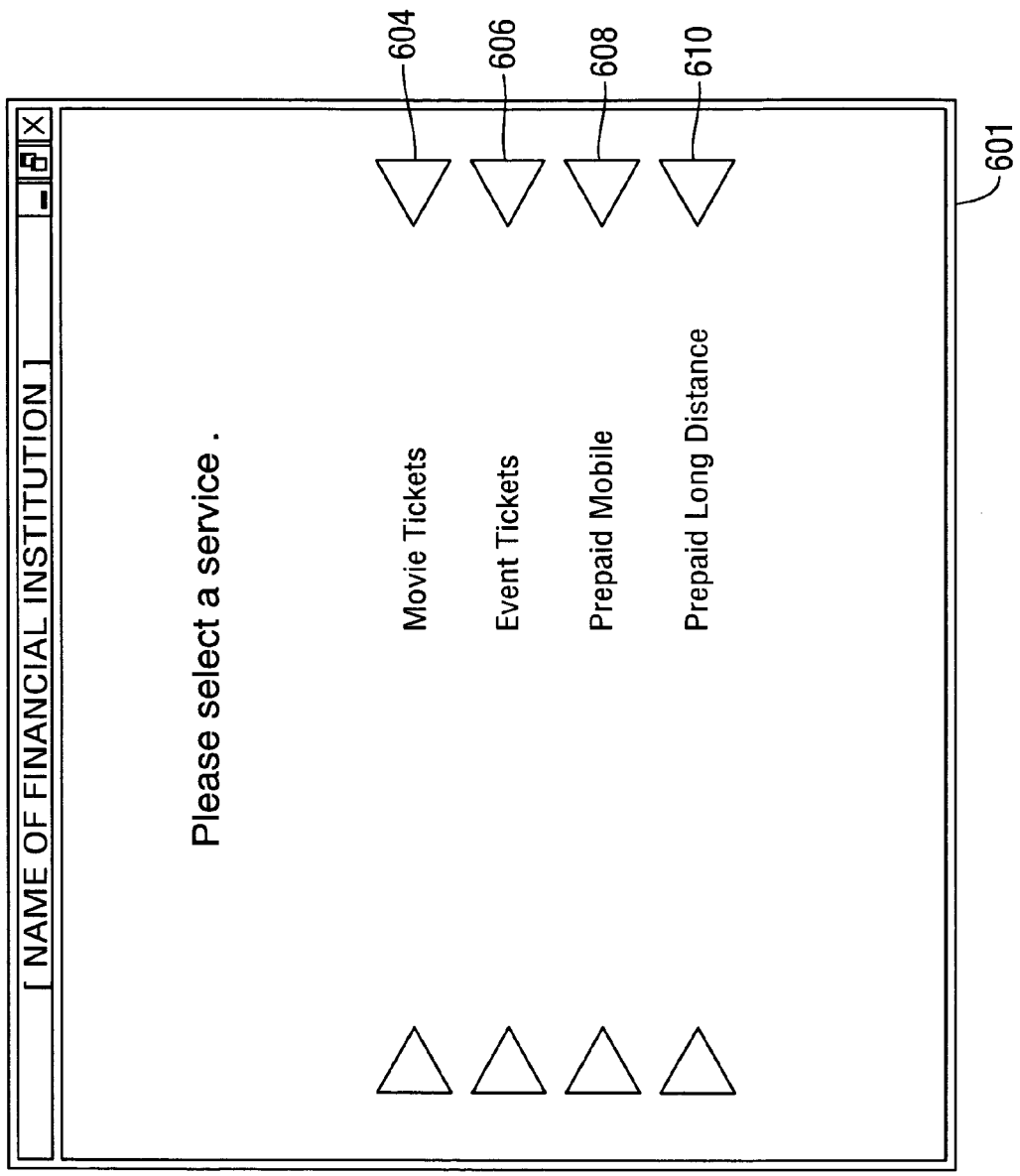
FIG. 6 illustrates an exemplary ATM screen display.

Once the user selects the "Shopping" key 504, illustrated in FIG. 5, the user may be presented with ATM screen 601, as shown in FIG. 6. The user may choose any of the listed products or services shown on ATM screen 601 by pressing the corresponding key. This key press initiates the transmission of ATM data to, for example, service provider server 104A or 104B shown in FIG. 1A or 1B. This ATM data may be data corresponding to the selection made by the user such as, in this example, the "Prepaid Long Distance" key 610.

The ATM data is received at service provider server 104A and 104B and reformatted such that the data can be utilized by the server of the merchant that is offering prepaid long distance service, or hosting this service on behalf of another. The reformatted transaction data representing the user selection is then transmitted via the Internet to the server(s) of the prepaid long distance merchant. The merchant then responds, via the merchant server 102, by transmitting merchant data to the service provider server(s) 104A or 104B. In this example, the merchant data includes a menu of services that are available under the "Prepaid Long Distance" option. The merchant data representing the menu items are then reformatted at the service provider server such that the menu can be displayed at the ATM.

Figure 7:
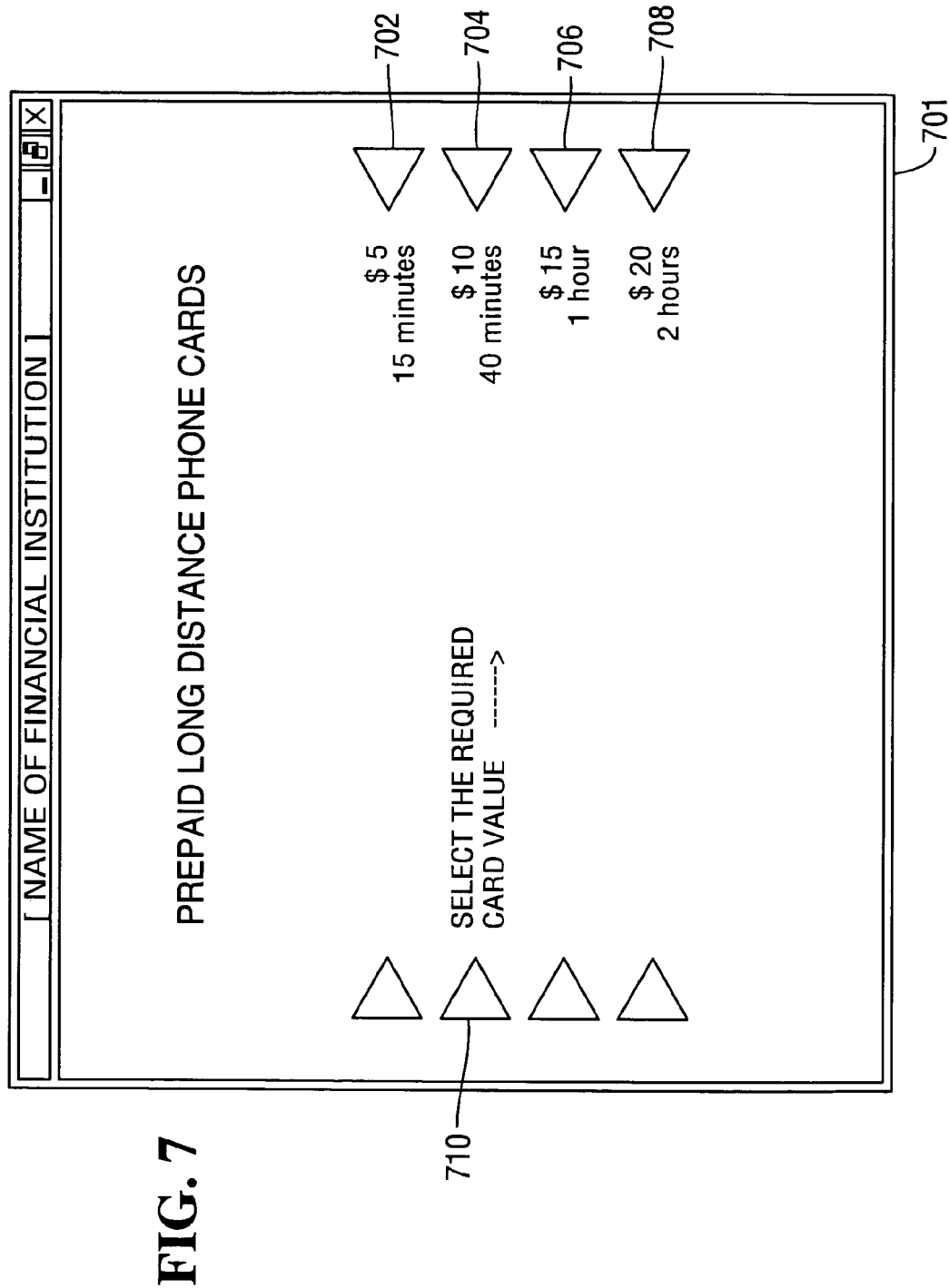
FIG. 7 illustrates an exemplary ATM screen display.

The reformatted merchant data representing the menu items is transmitted to the ATM and displayed on ATM screen 701, as shown in FIG. 7. The ATM user selects the desired product, such as 40 minutes of long distance time at the rate of $10, by pressing the corresponding key 704 at the ATM. Data representing the user's selection is transmitted to and received by service provider server. This selection data is reformatted into a format such that the data can be utilized by the merchant server(s). The reformatted selection data, representing the selection of 40 minutes of long distance time at a rate of $10, is transmitted to the merchant server. Because this transaction involves a purchase, the account information of the user is verified and payment for the purchase is processed as described above with reference to FIGS. 3A, 3B and 4. In this example, a receipt may be issued at the ATM, confirming the user's selection.

EXAMPLE 2

Movie Tickets

Figure 8:
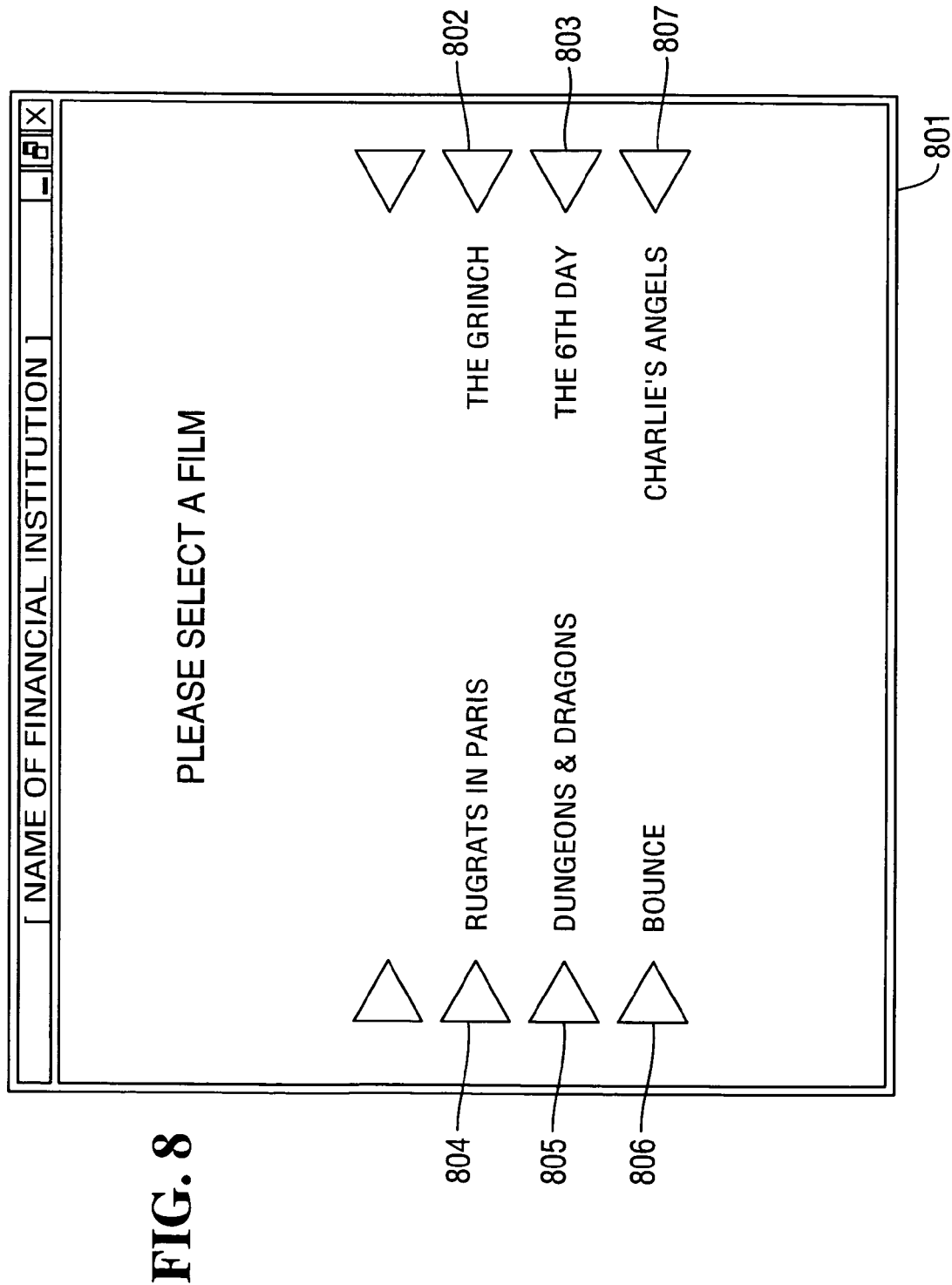
FIG. 8 illustrates an exemplary ATM screen display.
Figure 9:
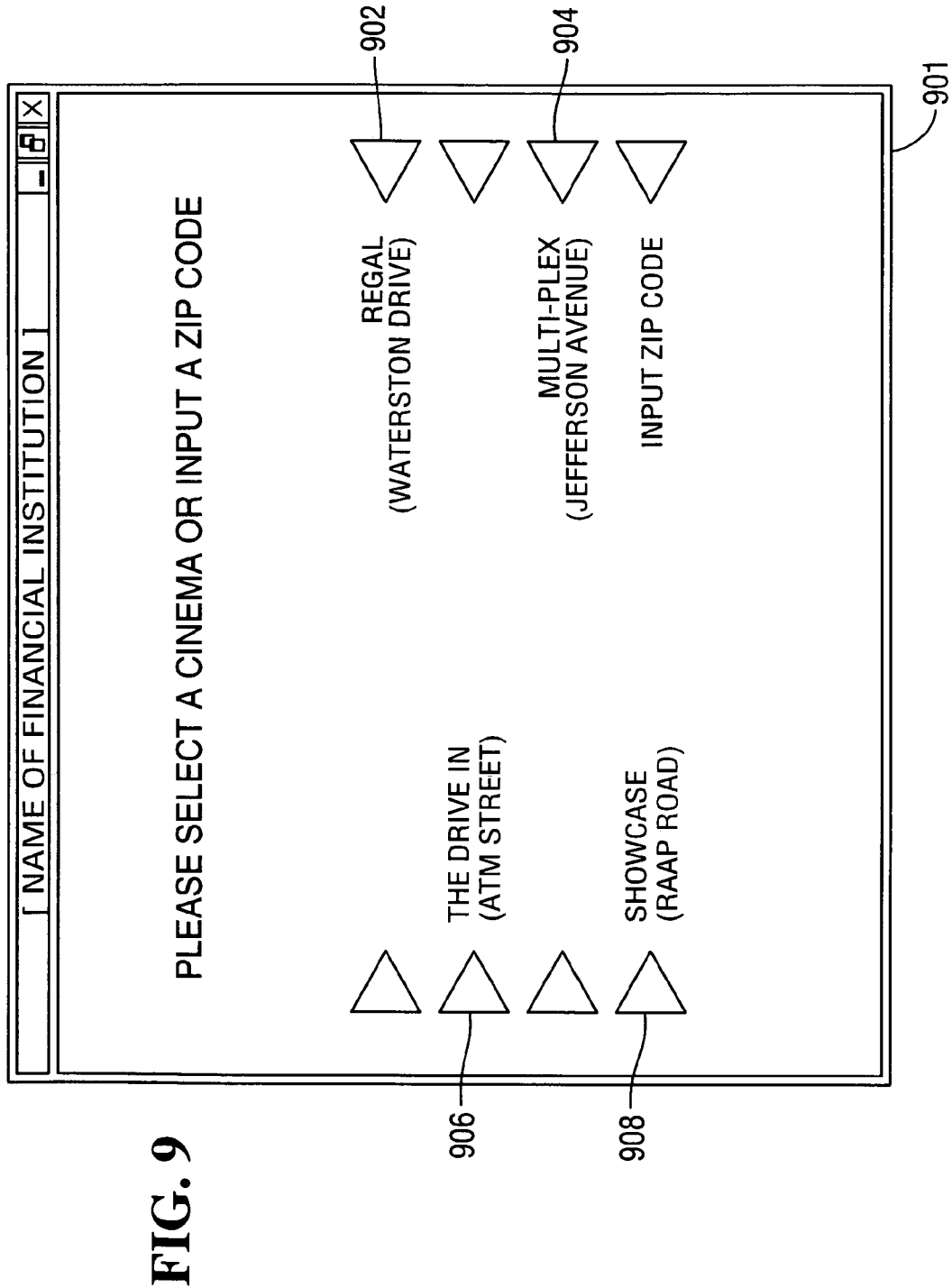
FIG. 9 illustrates an exemplary ATM screen display.
Figure 10:
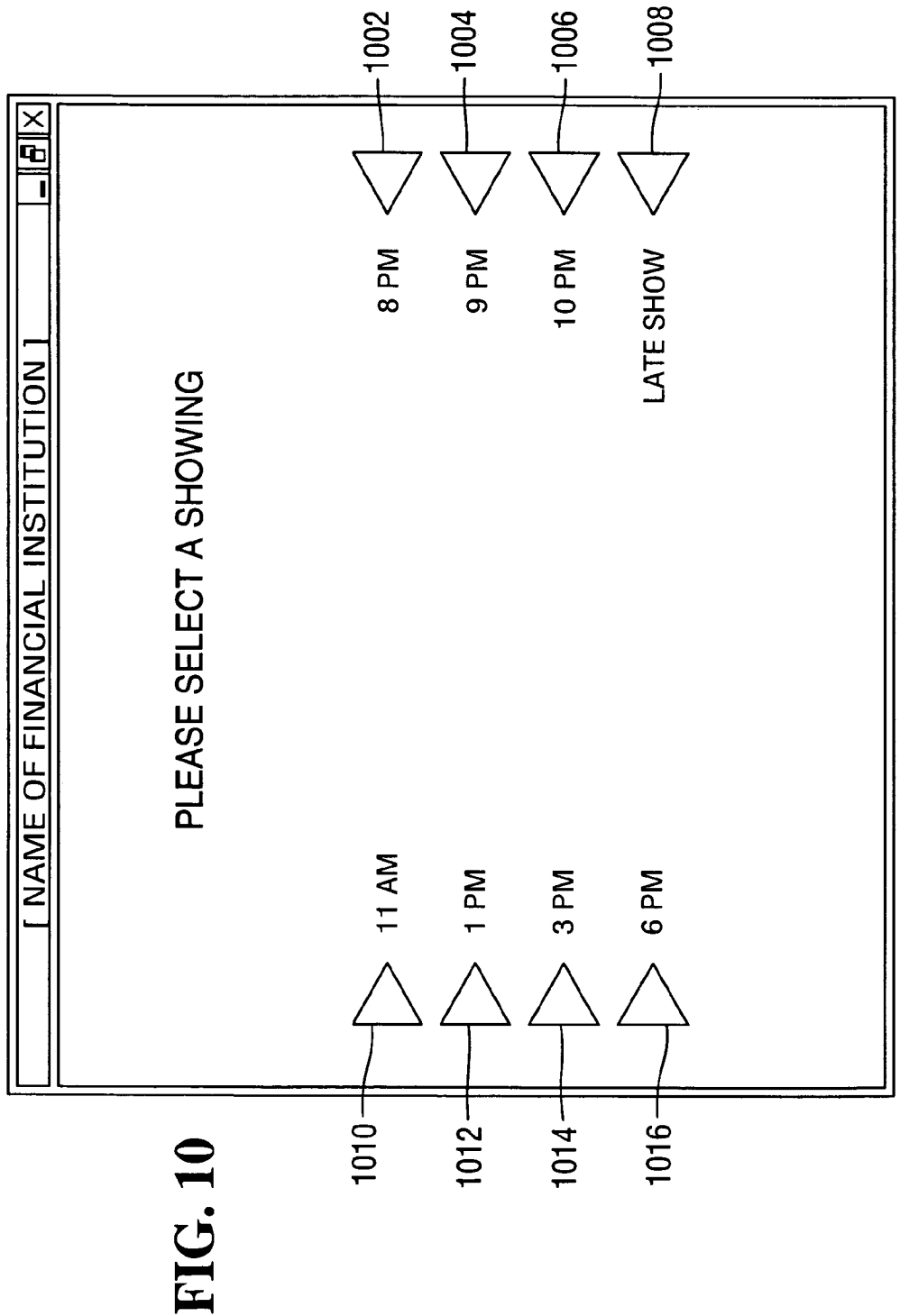
FIG. 10 illustrates an exemplary ATM screen display.
Figure 11:
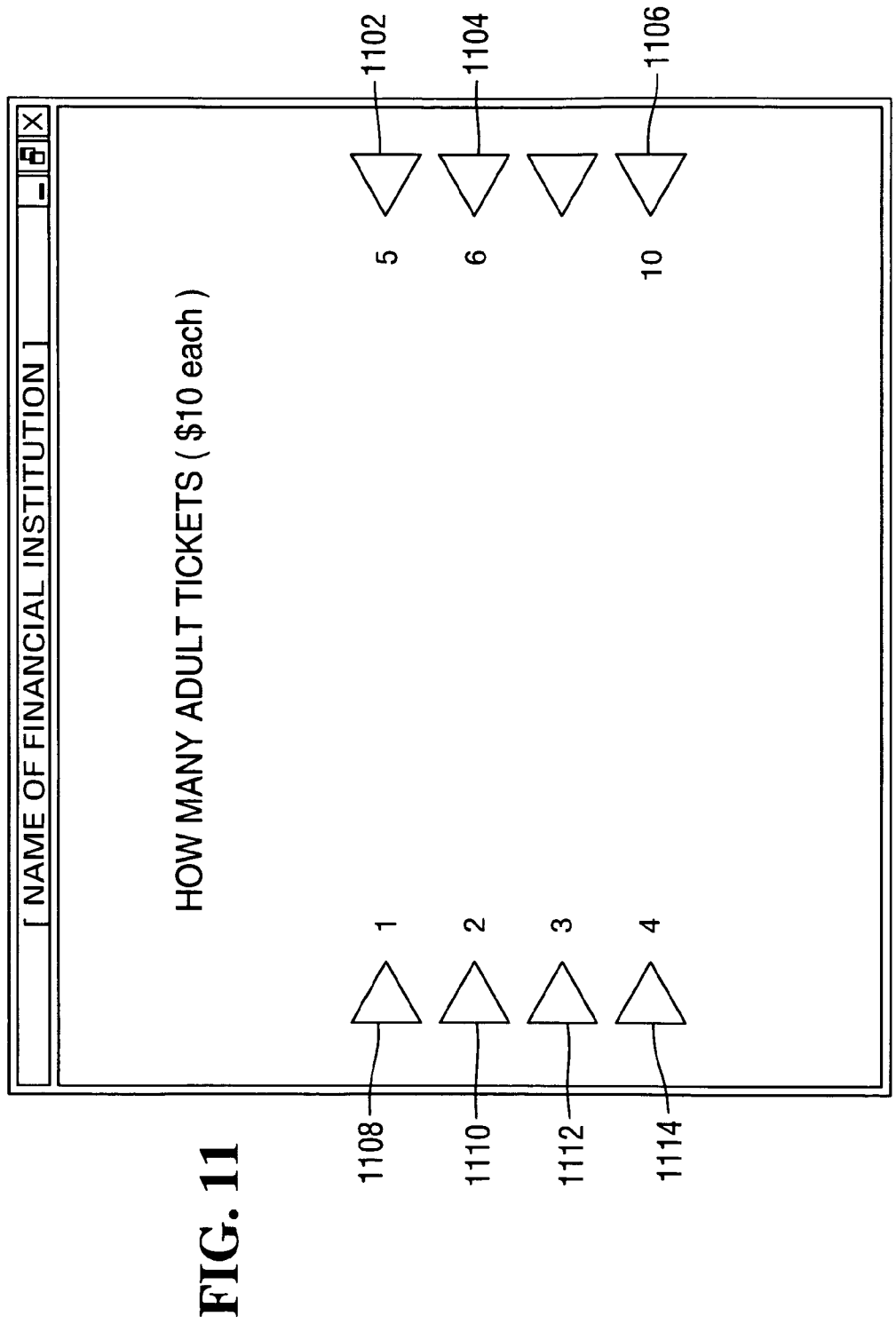
FIG. 11 illustrates an exemplary ATM screen display.
Figure 12:
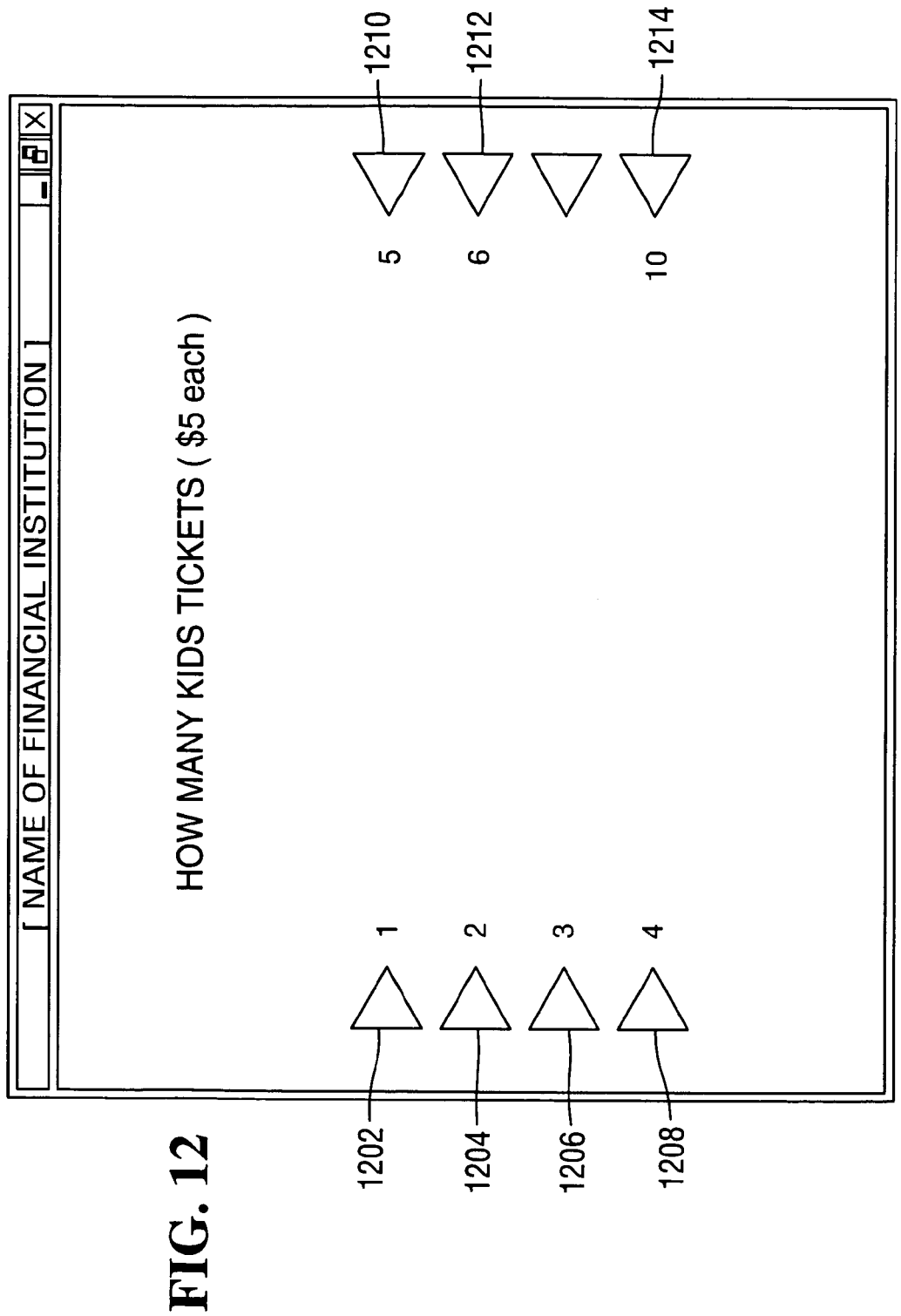
FIG. 12 illustrates an exemplary ATM screen display.

Another exemplary embodiment in which the methods and systems of the present invention may be implemented involves a transaction between an ATM user and a merchant that sells tickets to events such as movies. The ATM user initiates the transaction in the same way described in Example 1. In this example, the user selects key 604 for "Movie Tickets", with reference to FIG. 6. In response to the user's selection of "Movie Tickets", a selection of movies is displayed on ATM screen 801 as shown in FIG. 8. The ATM user may, in response, select a particular movie. Data representing the user's selection of a particular movie is transmitted to the service provider. This data is reformatted such that it may be utilized by the merchant server and then transmitted to the merchant server. The data transmitted may also contain location information, indicating to the merchant the locations at which the selected movie is showing that are of interest to the user. The location data may be data inputted by the user, such as a preferred postal zip code, or may be the location of the ATM being used in the transaction.

The merchant then processes the reformatted data and transmits data representing a menu of available theatres at which the selected movie (for example, "RUGRATS IN PARIS") is playing. If the data transmitted to the merchant server contains location data, the merchant may provide a menu of available theatres that are proximate the location.

Figure 13:
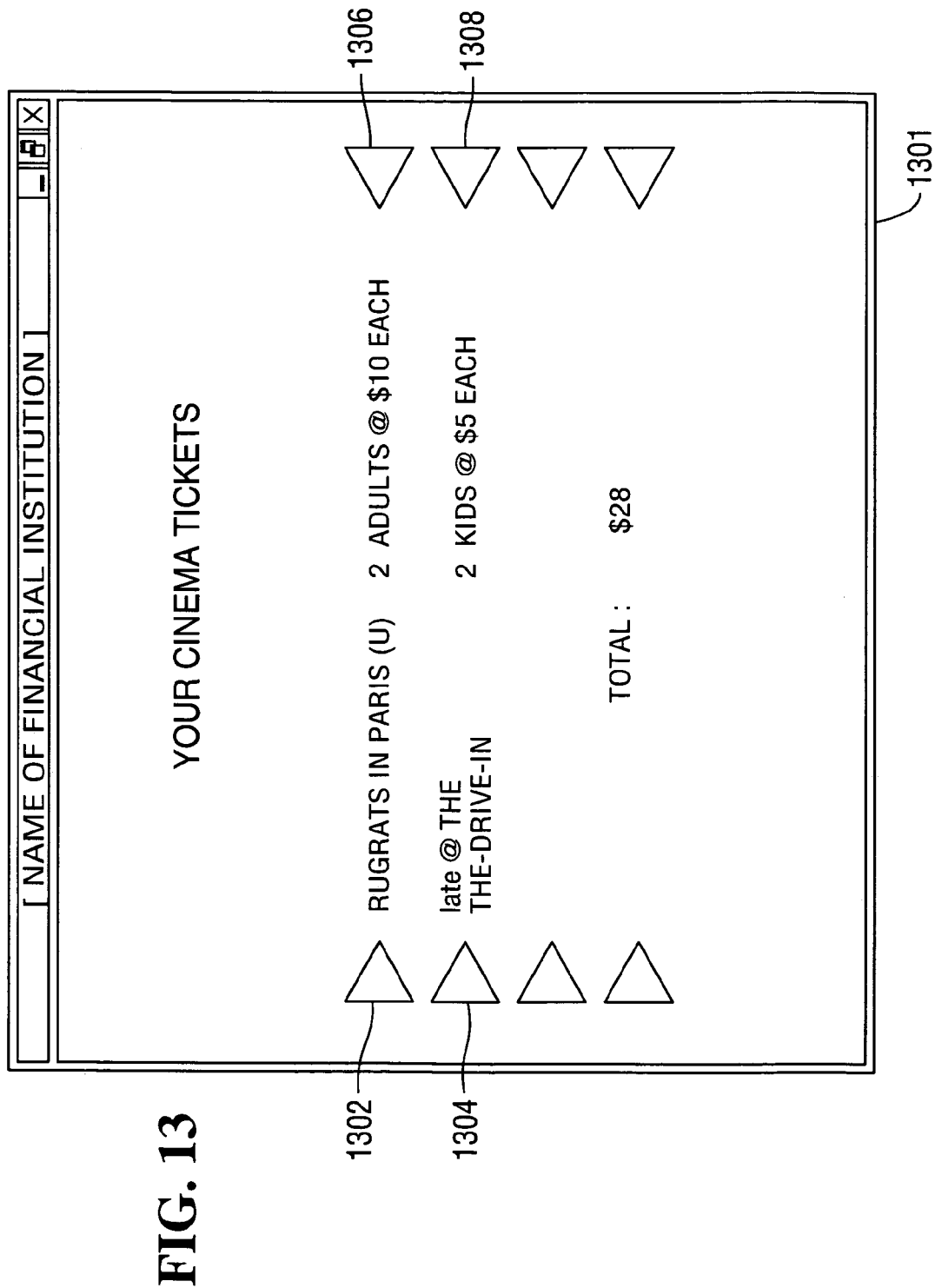
FIG. 13 illustrates an exemplary ATM screen display.

The data containing the menu of theatres is received at the service provider server and reformatted to enable display of the menu at the ATM. An exemplary menu of theatres is shown on ATM screen 901 of FIG. 9. After reviewing ATM screen 901 of FIG. 9, the user may be satisfied that it has received all of the information that it requires. For example, the user may have wanted to know what movie was playing and where a particular movie was playing, but did not want to purchase tickets. In that instance, the user may terminate the transaction without making a purchase. Alternatively, the iterative process may continue, prompting the user to select, for example, the theatre, show times, number of adult tickets desired, and number of child tickets desired, as shown in FIGS. 9, 10, 11 and 12. Upon completion of the tickets purchasing transaction, the settlement process is completed as described previously. In addition, the user may be presented with a transaction confirmation screen 1301, as illustrated in FIG. 13. The same confirmation data presented on the ATM screen may also be printed on a receipt for presentation at the theatre chosen by the user.

The following FIGS. 14-19 describe in detail the process for reformatting the data that is transmitted between the ATM and the service provider server, on the one hand, and merchant server and the service provider server, on the other hand.

Figure 14:
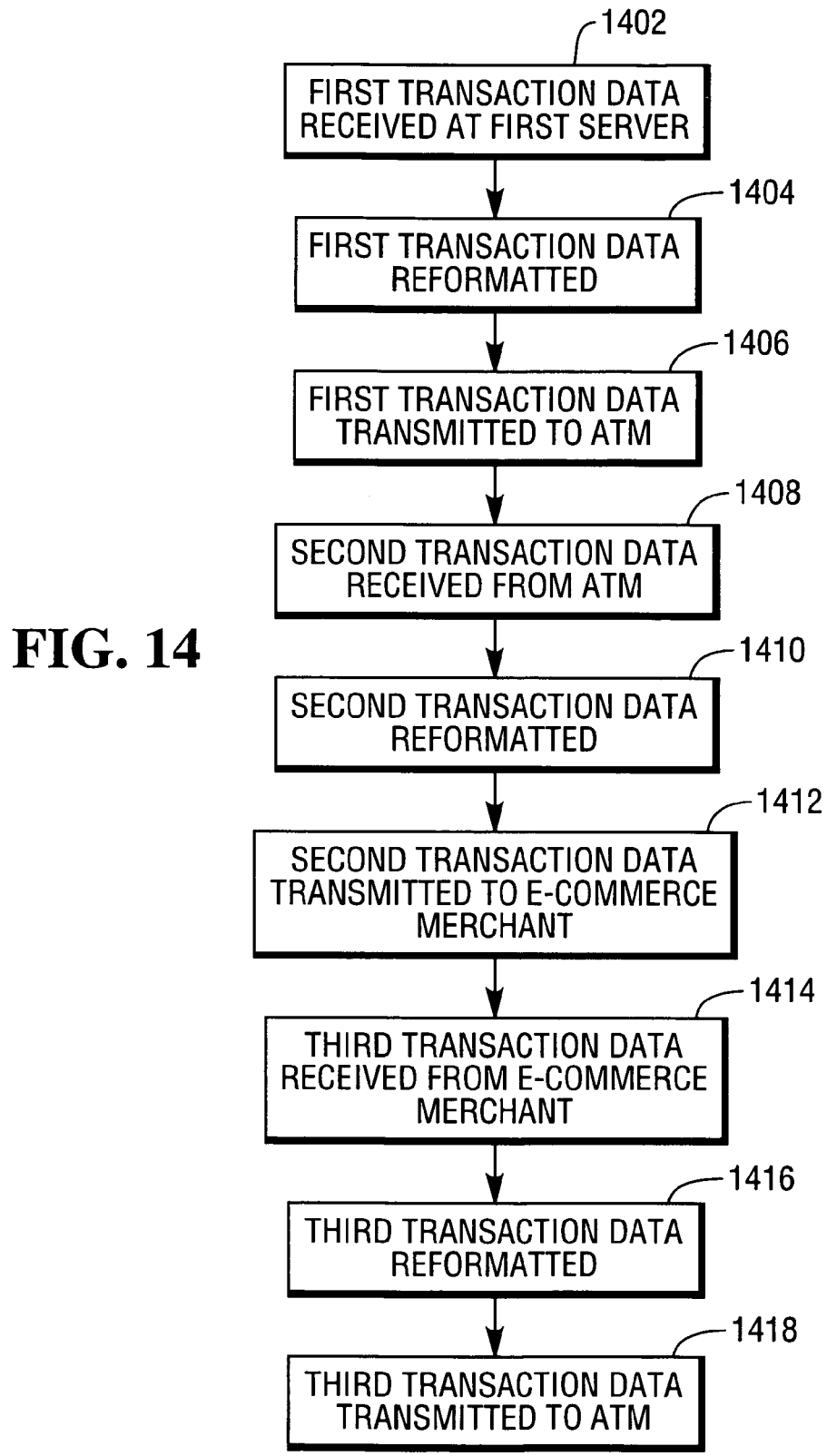
FIG. 14 is a flow chart illustrating a preferred embodiment method of facilitating communication of information related to an electronic commerce transaction via a global communications network.

FIG. 14 illustrates the steps of a method for facilitating communication of information related to an electronic commerce transaction via a global communications network between an ATM and an electronic commerce merchant server (for example, between ATM 108A or 108B and merchant server 102 via global communications network 110 of FIG. 1A or 1B) in accordance with a preferred embodiment of the present invention. In step 1402, first transaction data is received from the electronic commerce merchant at a first server in a first format. Thus, for example, transaction data may be received from merchant server 102 by service provider server 104 shown in FIGS. 1A and 1B. The first transaction data is received in a format such that it may be utilized by a server located on a global communications network (e.g., in XML format). In step 1404, the first transaction data is reformatted. In some embodiments, a subset of the first transaction data is selected for reformatting. For example, the data received by service provider server 104A or 104B from merchant server 102 may include data that is not necessary for carrying out a particular electronic commerce transaction at the ATM; thus, this extra data is stripped by service provider server 104A or 104B prior to reformatting.

The process of reformatting includes adding a number of different tags to the first transaction data. One of ordinary skill in the art will appreciate that the names given to the tags herein is for ease of identification only and that the tags may be given different names, but have the same or equivalent functionality, and fall within the scope of the present invention. Thus, in an exemplary embodiment, an XML declaration is added to the first service provider transaction data, as well as a vendor tag, which includes a merchant name, thereby allowing service provider server 104 to associate a particular message with a particular electronic commerce merchant. In the preferred embodiment, one or more message tags are added to the first transaction data. The message tag(s) are used to instruct the ATM to perform one or more functions relating to the electronic commerce transaction. Each message tag may include an identification attribute, which holds the unique identifier for each message tag and which is used for internal message navigation.

In addition, the message tag(s) added in step 1404 may include a number of sub-tags. For example, the message tag(s) may include one or more choice tags, which associate a key press on the ATM with a selection related to the electronic commerce transaction. For example, with reference to FIG. 6, a choice tag would enable association of key press 610 on the display screen 601 of ATM 108 with selecting "Prepaid Long Distance". The choice tag(s) may further include one or more link tags, which associate a uniform resource locator ("URL") (i.e., a bookmark within a page or a fully qualified URL) with the selection. In addition, the choice tag(s) may include a label tag, which contains the string that will be displayed along with the selection and may contain formatting data. The choice tag(s) may also include one or more data tags. The data tag(s) are used to transmit data relating to the transaction and include a nametag for identifying the data. The data tag(s) may also include a value tag, which identifies value data associated with the nametag. Where the value tag is empty or is self-closing, it is indicating a request for data. For example, with reference to FIG. 7, the choice tag, which enables the selection, may contain an empty value tag, thus indicating a request for data (such as $5.00) to associate with the selection.

The message tag(s) added in step 1404 may also include one or more header tags, used to hold more detailed information about the message, such as message type information, and including necessary transaction control and card formatting data. For example, the header tag(s) may include a name tag, which contains a text to be used as a title to the ATM screen, as illustrated in FIG. 6 by the text "Please select a service." The header tag(s) may also include one or more timer tags, which force navigation upon an occurrence of a predetermined time lapse. The timer tag may include a link tag, identifying the location of the information (e.g., using http: or c:) that will be displayed on the ATM screen upon the lapsing of a predetermined amount of time, identified by a timerperiod tag. For example, this may be useful where the content of a nametag is an advertising banner. It may be desirable to have this banner appear temporarily on the ATM screen. This temporal display is achieved by assigning the timer tag value equal to the amount of time the banner would be displayed. The header tag(s) may also include a title tag, which contains a text string that may include flat text or a formatting element and one or more data elements (e.g., date and time).

The message tag(s) may also include one or more receipt tags, used to identify information that is to be printed on a receipt. For example, the receipt information may contain information indicating how many tickets were purchased, at what price, and for which movie. FIG. 13 illustrates the ATM screen display of information that may be printed on a receipt. The receipt tag(s) may also include one or more cut tag(s), indicating when a receipt should be cut at the ATM. In the preferred embodiment, the receipt tag(s) are used in conjunction with another tag such as a choice tag or specified timer within the header.

Further, the message tag(s) may include one or more infotext tags, used to identify the main descriptive block of text to be displayed on the ATM. The infotext tag(s) may be flat text with certain formatting elements. The infotext may include an input tag, as discussed more fully below. One or more footer tags, used to identify information that may be displayed at the bottom of the ATM display screen, may also be included in the message tag(s). Like the infotext tag(s), the footer tag(s) may include flat text with certain formatting elements. Also, one or more serverdata tags may be included in the message tag(s) to identify administrative transaction data. In the preferred embodiment, the serverdata tag(s) are populated with data inserted by the service provider server, not by the user of the ATM. For example, this tag may hold the zip code of the ATM location, other identifying information about ATM or an electronic commerce transaction identification number.

Returning again to the flow chart depicted in FIG. 14, in step 1406, the reformatted first transaction data is transmitted to the ATM. The reformatted first transaction data is capable of being utilized by the ATM without use of a browser (e.g., an Internet browser) due to the reformatting of the data.

Figure 15B:
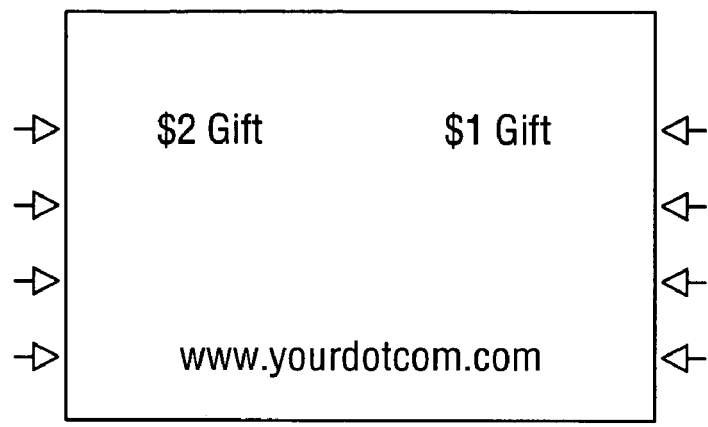
FIG. 15B illustrates the ATM screen display resulting from the reformatted data of FIG. 15A.
Figure 15F:
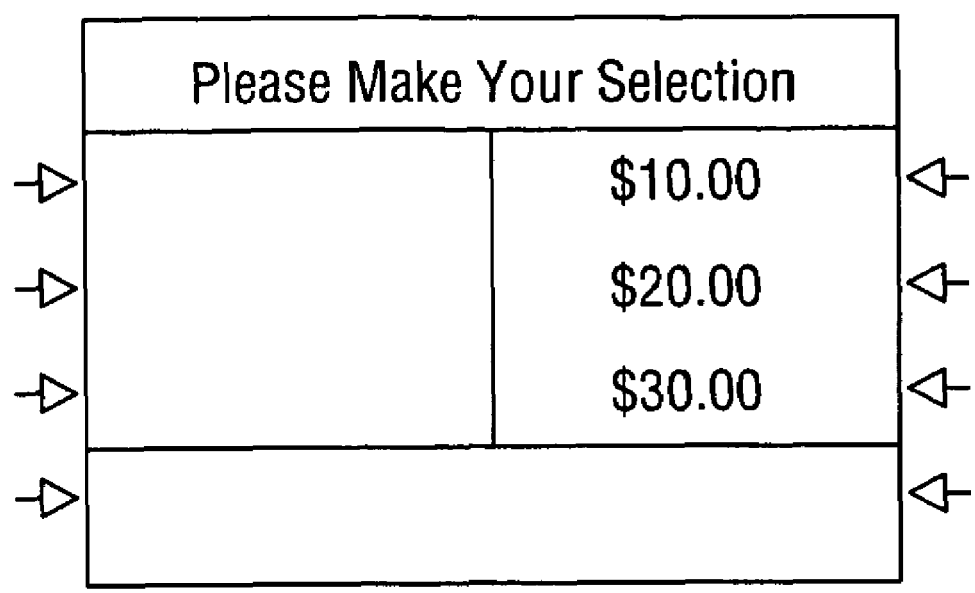
FIG. 15F illustrates the ATM screen display resulting from the reformatted data of FIG. 15D.

With reference to FIG. 15A, an exemplary message tag is shown. Vendor tag 1502 identifies the merchant associated with the message, in this example, "yourdotcom.com". Message identification tag 1503 identifies that this message is associated with card 1 (as discussed below in more detail with reference to FIG. 16). Header tag 1504 includes nametag 1505 and title tag 1506 indicating on the ATM screen to the user "Please make your selection." Footer tag 1507 displays the name of the merchant, "www.yourdotcom.com", at the bottom of the ATM display screen. Serverdata tag 1508 is populated by server provider server 104 and includes data tag 1509 through which a request for the ATM zip code (identified by name tag 1510) is made by way of self-closing value tag 1511. Choice tag 1512 includes link tag 1513 and label tag 1514, as well as data tag 1515. Choice tag 1512 thus allows for the presentation of the label "$1 Gift" on the ATM display screen next to a particular button/key press on the ATM and associates this key press with a value of 1 and the link "www.yourdotcom.com\gcvalue.asp". Similarly, choice tag 1516 includes link tag 1517, label tag 1518 and data tag 1519. Choice tag 1516 thus allows for the presentation of the label "$2 Gift" on the ATM display screen next to a particular button/key press on the ATM and associates this key press with a value of 2 and the link "www.yourdotcom.com\gcvalue.asp". The output of the exemplary message tag on the ATM display screen shown in FIG. 15A is shown in FIG. 15B. FIG. 15C provides an additional example of a message tag.

Assuming, in the example shown with reference to FIGS. 15A and 15B, the $1 Gift was selected, the response from the ATM is shown with reference to FIG. 15D. The response can be made, for example, using http get protocol, as shown in http get protocol response 1520, or using http post protocol, as shown in http post protocol response 1522.

Another example relating to prepaid long distance phone cards is shown with reference to FIGS. 15E-15H.

With further reference to FIG. 14, in a preferred embodiment, in step 1408, second transaction data is received from the ATM 108A or 108B at service provider server 104A or 104B, in a second format. The second transaction data is capable of being interpreted by the ATM. In step 1410, the second transaction data is reformatted, which includes adding to the second transaction data one or more request tags. The request tag(s) are used to indicate to the merchant server 102 a user selection (e.g., a key press or navigation) relating to the transaction and include one or more data tags, as described above. A request tag is used when https post protocol is required. In step 1412, the reformatted second transaction data, capable of being utilized by the Internet server, is transmitted to the merchant. FIG. 15G provides an example of a request header tag 1524.

As shown further in FIG. 14, in the preferred embodiment, in step 1414, third transaction data is received from the merchant server 102 at the service provider server 104A or 104B, in the first format. In step 1416, the third transaction data is reformatted, which includes adding to the third transaction data one or more responsedata tags. The responsedata tag(s) indicate information from the merchant in response to the user selection. In step 1418, the reformatted third transaction data, capable of being utilized by the ATM, is transmitted to the ATM. Thus, for example, the responsedata tag would be used by merchant server 102 to pass back to ATM 108A or 108B return data, through service provider server 104A or 104B, without passing any screen or receipt information. An example of responsedata tag 1526 is shown in FIG. 15H.

Figure 16:
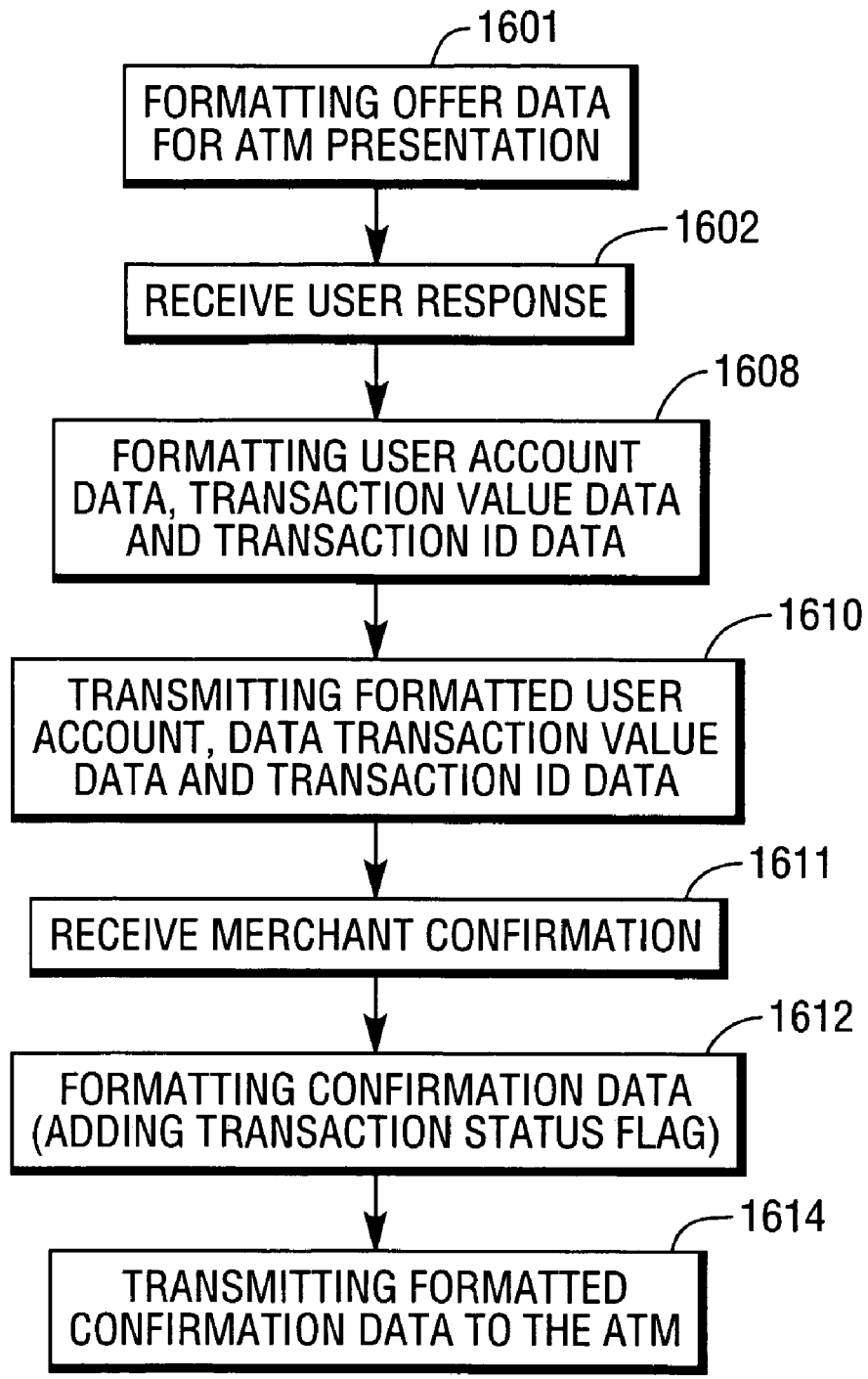
FIG. 16 is a flow chart illustrating a preferred embodiment of a method for facilitating an electronic commerce transaction occurring over a global communications network between an electronic commerce merchant and a user of an ATM.
Figure 17:
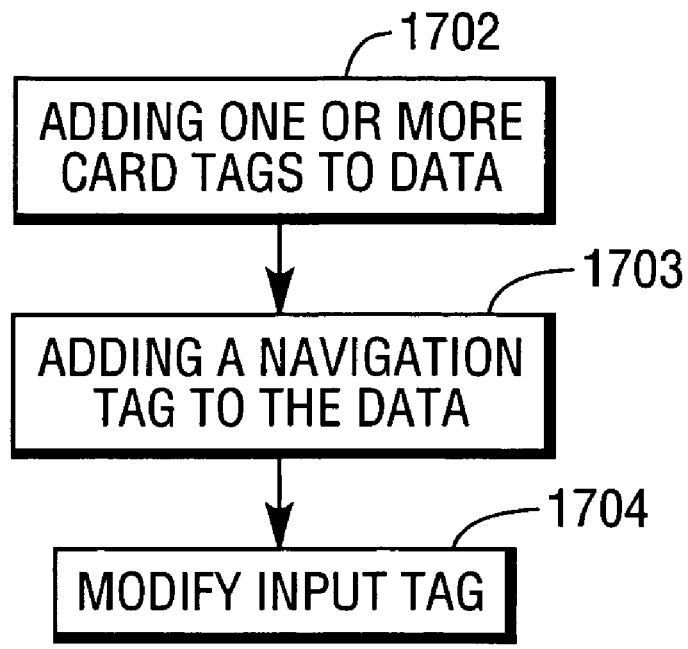
FIG. 17 is a flow chart illustrating a preferred embodiment of steps for formatting offer data for ATM presentation.

FIG. 16 shows the steps of a method for facilitating an electronic commerce transaction occurring over a global communications network between an electronic commerce merchant and a user of an ATM in accordance with a preferred embodiment of the present invention. The ATM includes a display screen and one or more keys for indicating a selection relating to said transaction, exemplified in FIG. 8. In step 1601, offer data associated with the transaction is formatted for presentation at the ATM. As shown in FIG. 17 (step 1601), the formatting includes adding one or more card tags, step 1702 and navigation tags, step 1704. The formatting step also includes modifying an input tag associated with the data, in step 1706.

The card tag(s) are associated with one or more cards and facilitate display of transaction information on the display screen. Each card is enclosed within card tags and, optionally, has title and identification attributes. The title attribute indicates the title to be displayed at the top of the ATM display screen. The identification attribute is used to identify each card and enables linking from one card to another. The card tag(s) further specify content (such as text and graphics information) to be displayed on the ATM display screen and the layout and format of such content. Graphics may be displayed, including the source of the graphic to be displayed within an image tag. An alternate attribute may be included within the image tag to identify the image to be displayed in the event the source is not available. In addition, the card tag(s) may specify information relating to any receipt to be printed, such as the text to be printed on the receipt and cutting the receipt.

The navigation tag facilitates navigation within or between cards and within the global communications network. Thus, for example, the navigation tag allows for the identification of a particular key on the ATM, association of that key with a label on the ATM display screen, and further association of the key with linking information. The linking information allows for display of information associated with a position within a card to which the user has linked or within a different card to which the user has linked upon the user's depression of an associated key. In addition, the linking information allows for display of information associated with a URL upon the user's depression of a key associated with the URL. Thus, a link to a URL is qualified with the server name and the appropriate protocol, for example, "http://www.merchant-.com/index.asp". All links to servers are preferably transmitted through service provider server 104A or 104B. A link to or within a card should be preceded by a place holder, such as "#", for example "#anothercard".

Other tags may be used within a card to control navigation. For example, certain tags may be used to cause the occurrence of a specific action upon the expiration of a specified time period. Another tag may facilitate redirection of the ATM to another page.

The input tag facilitates acceptance of one or more input variables from the user. This input tag specifies the manner in which input will be accepted from the user and passed to the service provider server 104A or 104B during the http requests. The input tag includes a name attribute, which identifies the name of the variable to set with the result of the user's text input. In addition, the input tag may include a type attribute indicating, for example, whether the input will be text (echoed on the ATM display screen as the user types) or a password (echoed on the ATM display screen in an obscured form as the user types). Further, the input tag may include variable format information. This formatting information may include input mask information, indicating whether the characters are uppercase, alphabetic, punctuation, numeric, the number of characters, as well as the next character in the field. In addition, the formatting information may indicate whether an input element of zero length is acceptable and whether there exists a default value for the field. The formatting information may further include maximum number of characters, and the minimum or maximum numerical value of the input.

The transmission of data within a card tag may be sent securely using, for example, Secure Socket Layer ("SSL") protocol. The commencement of a SSL communication is indicated by an "https" flag within the navigation tag. Several items of information are preferably sent in a secure communication, such as the user's debit or credit card number, expiration date, name, and PIN data. In addition, the particular ATM may have a unique identifier, which also may be included in the communication. Furthermore, each transaction using the methods of the present invention may have a transaction serial number, which may be included in the communication. The ATM 108A or 108B will store the transaction serial number for journaling and sending to service provider server 104A or 104B when the transaction reply is received by the ATM 108A or 108B. Preferably, the https request will include the value of the transaction. This will enable the logging of a transaction value against the merchant server 102 as discussed more fully with reference to FIG. 4.

Thus, referring again to FIG. 16, assuming the user responds to the offer presented on the ATM, the user response is received in step 1602. In step 1608, the data relating to the user's account (e.g., card number), data relating to the value of the transaction (e.g., the transaction price associated with the product/service purchased by the user) and transaction identifier data are formatted. The formatting step includes adding to the user account data a secure navigation indicator. In step 1610, the formatted user account data, transaction value data and transaction identifier data is transmitted to the merchant via the global communications network. After receiving this data, merchant may confirm the transaction to the user, which is received in step 1611. In this case, in step 1612, confirmation data is formatted by, for example, adding to the confirmation data a transaction status tag. The transaction status tag indicates the status of the transaction (i.e. authorized or declined) and, preferably, identifies the transaction serial number assigned by ATM 108A or 108B and the merchant server 102 identification number. In step 1614, the formatted confirmation data is transmitted to the ATM.

In the preferred embodiment, once the transaction reply (described with reference to FIG. 15H) is received from merchant server 102 at ATM 108A or 108B, ATM 108A or 108B may log the success or failure of the transaction with service provider server 104A or 104B. The transaction reply may contain an exit tag, indicating that control should be returned to the ATM application. In other embodiments, however, chained transactions are available.

Other miscellaneous tags may be used with the methods and systems of the present invention. For example, service provider server 104A or 104B may retrieve cached data relating to the electronic commerce transaction from merchant server 102 at a particular time period. In addition, service provider server 104A or 104B may upload journal files at a particular time of the day. Each of these time periods may be set within a configuration tag using a download time element.

Figure 18A:
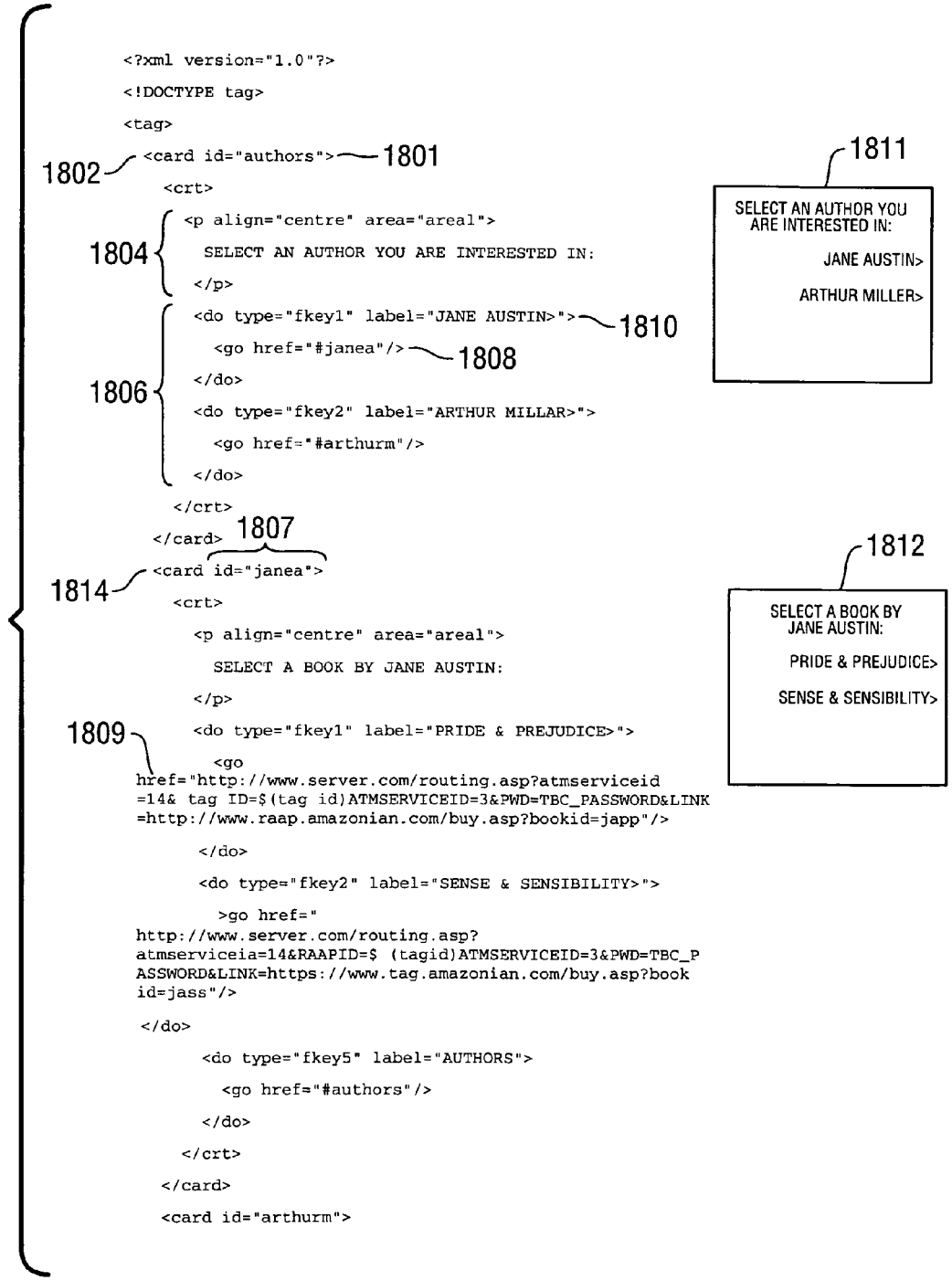

FIG. 18 shows an example of a series of tags that may be used in connection with a transaction for offering and subsequent purchasing of a book at an ATM. Card tag 1802 includes the identification attribute 1801, in this case "authors", of this particular card. Text tag 1804 shows the text "SELECT AN AUTHOR YOU ARE INTERESTED IN:" centered in area 1 of the card. Go tag 1808 of navigation tag 1806 provides for the assignment of "fkey1", labeled "JANE AUSTIN>", to card 1807, identified "janea" through do tag 1810. The way in which the text of this card is displayed on the ATM display screen is shown in display area 1811. Within the card 1814 identified "janea", go tag 1809 allows the user to submit the http request shown upon selection of the key "fkey1" labeled "PRIDE & PREJUDICE>" on the ATM. Display area 1812 shows the text of card 1814 as displayed on the ATM display screen. Exit tag 1813 indicates the end of the electronic commerce transaction and returns control to the ATM.

FIG. 19 shows an example of data, which may be returned from service provider server 104 upon, for example, the user selecting a book in the example shown in FIG. 19A. Within card 1930 is the status (in this case "authorize"), as well as the identification numbers of the merchant, the server and the serial number. Text tag 1936 displays on the ATM display screen "PLEASE WAIT FOR YOUR RECEIPT" shown on exemplary screen 1937. Receipt tag 1934 indicates the printing of text on the receipt 1936.

While the invention has been described in detail and with reference to specific embodiments thereof, it will be apparent to one skilled in the art that various changes and modifications can be made therein without departing from the spirit and scope thereof. For example, the specific names of the tags provided herein are given by way of example and not limitation. Tags with similar functionality may be given different names within the scope of the present invention. Thus, it is intended that the present invention cover the modifications and variations of this invention provided they come within the scope of the appended claims and their equivalents.

What is claimed is:

1. A method of facilitating an electronic commerce transaction between a user of an automatic teller machine (ATM) having ATM interface software which controls a display and a printer of the ATM and an electronic commerce merchant via a global communications network said method comprising the steps of:
   a) receiving, at one or more servers remote from the ATM and remote from one or more electronic commerce merchant servers, ATM data comprising transaction data;
   b) reformatting, at the one or more remote servers, said transaction data into a first format that enables the transaction data to be utilized by a server located on a global communications network, reformatting including translating the ATM data into a self contained package allowing for processing by the one or more electronic merchant servers in a native format used by the one or more electronic merchant servers;
   c) transmitting, over the global communications network, the reformatted transaction data to the one or more electronic commerce merchant servers from the one or more remote servers;
   d) receiving, at the one or more remote servers from the electronic commerce merchant, merchant data not capable of being used by the ATM, wherein said merchant data is generated by the one or more electronic commerce merchant servers in response to the reformatted transaction data;
   e) reformatting, at the one or more remote servers, said merchant data into a second format that enables the merchant data to be utilized by the ATM, reformatting including translating the merchant data into a format utilized by the ATM to controls the display of the ATM; and
   f) transmitting the reformatted merchant data to the ATM from the one or more remote servers.

2. The method of claim 1 wherein the ATM data further comprises account data associated with an account of said user, the transaction is associated with a transaction price, and the method further comprises the step of:
   g) verifying with a processing network that the account of the user authorizes the transaction;
   wherein, upon verifying that the account of the user authorizes the transaction, the transaction is settled by applying the transaction price to the account of the user.

3. The method of claim 2 wherein step g) is performed by the electronic commerce merchant, the processing network is a credit card company, and the transaction is settled between the credit card company and the electronic commerce merchant.

4. The method of claim 2 wherein step g) is performed by a facilitator of the transaction, the processing network is an entity that performs credit verification services, and the transaction is settled between the facilitator and the credit verification entity.

5. The method of claim 1 wherein the transaction is personal identification number (PIN) based and associated with a transaction price, the ATM data further comprises PIN data corresponding to an account of said user, and the method further comprises the steps of:
   g) verifying the PIN data with a processing network; and
   h) verifying with the processing network that the account of the user authorizes the transaction;
   wherein, upon verifying the PIN data and that the account of the user authorizes the transaction, the transaction is settled by applying the transaction price to the account of the user.

6. The method of claim 5 wherein steps g) and h) are performed by a facilitator of the transaction, the processing network is a financial institution, and the transaction is settled between the facilitator and the financial institution.

7. The method of claim 1 wherein the first format comprises at least one of extensible markup language (XML) or wireless markup language (WML).

8. The method of claim 1 wherein said transaction data comprises an inquiry from the ATM user regarding one or more electronic commerce offers.

9. The method of claim 1 wherein said transaction data comprises an order relating to one or more electronic commerce transactions.

10. The method of claim 9 wherein said merchant data comprises order confirmation data in extensible markup language (XML) format, and the translated order confirmation data is utilized to display the order confirmation data on the display of the ATM without the use of a browser.

11. The method of claim 10 wherein the merchant data further comprises receipt information, the translated receipt information is utilized to print a receipt by the printer of the ATM.

12. The method of claim 1 wherein the transaction data comprises location information and said merchant data comprises service information corresponding to the location.

13. The method of claim 1 further comprising selecting only a subset of said merchant data for reformatting into the second format.

14. A system for facilitating an electronic commerce transaction between a user of an automatic teller machine (ATM) having ATM interface software which controls a display and a printer of the ATM and an electronic commerce merchant via a global communications network comprising:

one or more servers, remote from the ATM and remote from one or more electronic commerce merchant servers, that receive ATM data comprising transaction data; reformat said transaction data into a first format that enables the transaction data to be utilized by a server located on a global communications network, reformatting including translating the ATM data into a self contained package allowing for processing by the one or more electronic merchant servers in a native format used by the one or more electronic merchant servers; transmit, over the global communications network, the reformatted transaction data to the one or more electronic commerce merchant servers; receive, from the electronic commerce merchant, merchant data not capable of being used by the ATM, wherein said merchant data is generated by the one or more electronic commerce merchant servers in response to the reformatted transaction data; reformat said merchant data into a second format that enables the merchant data to be utilized by the ATM, reformatting including translating the ATM data into a format used by the ATM to control the display of the ATM; and transmit the reformatted merchant data to the ATM.

15. A machine-readable medium that includes instructions for facilitating an electronic commerce transaction between an automatic teller machine (ATM) user and an electronic commerce merchant via a global communications network, wherein such instructions, when executed by a processor, cause the processor to:

a) reformat ATM data comprising transaction data into a first format that enables the transaction data to be utilized by a server located on a global communications network, reformatting including translating the ATM data into a self contained package allowing for processing by the one or more electronic merchant servers in a native format used by the one or more electronic merchant servers, wherein said ATM data is received at one or more servers remote from the ATM and remote from one or more electronic commerce merchant servers;

b) transmit, over the global communications network, the reformatted transaction data to the one or more electronic commerce merchant servers from the one or more remote servers;

c) reformat merchant data into a second format that enables the merchant data to be utilized by the ATM, wherein said merchant data is received at the one or more remote servers from the electronic commerce merchant and is generated by the one or more electronic commerce merchant servers in response to the reformatted transaction data, reformatting including translating the ATM data into a self contained package allowing for processing by the ATM in a native format used by the ATM; and d) transmit the reformatted merchant data to the ATM from the one or more remote servers.

16. A method of facilitating an electronic commerce transaction between an automatic teller machine (ATM) user and an electronic commerce merchant via a global communications network said method comprising the steps of:

a) receiving, at one or more servers remote from the ATM and remote from one or more electronic commerce merchant servers, ATM data comprising transaction data;

b) reformatting, at the one or more remote servers, said transaction data into a first format that enables the transaction data to be utilized by a server located on a global communications network, reformatting including translating the ATM data into a self contained package allowing for processing by the one or more electronic merchant servers in a native format used by the one or more electronic merchant servers;

c) transmitting, over the global communications network, the reformatted transaction data to the one or more electronic commerce merchant servers from the one or more remote servers;

d) receiving, at the one or more remote servers from the electronic commerce merchant, merchant data wherein said merchant data is generated by the one or more electronic commerce merchant servers in response to the reformatted transaction data;

e) reformatting, at the one or more remote servers, said merchant data into a second format that enables the merchant data to be utilized by the ATM, reformatting including translating the merchant data into a self contained package in a native format used by the ATM, wherein said utilization by said ATM is effectuated without use of a browser; and f) transmitting the reformatted merchant data to the ATM from the one or more remote servers.

17. The method of claim 16 wherein the ATM data further comprises account data associated with an account of said user, the transaction is associated with a transaction price, and the method further comprises the step of:

g) verifying with a processing network that the account of the user authorizes the transaction;

wherein, upon verifying that the account of the user authorizes the transaction, the transaction is settled by applying the transaction price to the account of the user.

18. The method of claim 17 wherein step g) is performed by the electronic commerce merchant, the processing network is a credit card company, and the transaction is settled between the credit card company and the electronic commerce merchant.

19. The method of claim 17 wherein step g) is performed by a facilitator of the transaction, the processing network is an entity that performs credit verification services, and the transaction is settled between the facilitator and the credit verification entity.

20. The method of claim 16 wherein the transaction is personal identification number (PIN) based and associated with a transaction price, the ATM data further comprises PIN data corresponding to an account of said user, and the method further comprises the steps of:

g) verifying the PIN data with a processing network; and h) verifying with the processing network that the account of the user authorizes the transaction;

wherein, upon verifying the PIN data and that the account of the user authorizes the transaction, the transaction is settled by applying the transaction price to the account of the user.

21. The method of claim 20 wherein steps g) and h) are performed by a facilitator of the transaction, the processing network is a financial institution, and the transaction is settled between the facilitator and the financial institution.

22. The method of claim 16 wherein the first format comprises at least one of extensible markup language (XML) or wireless markup language (WML).

23. The method of claim 16 wherein said transaction data comprises an inquiry from the ATM user regarding one or more electronic commerce offers.

24. The method of claim 16 wherein said transaction data comprises an order relating to one or more electronic commerce transactions.

25. The method of claim 24 wherein said merchant data comprises order confirmation data.

26. The method of claim 23 wherein the merchant data further comprises receipt information.

27. The method of claim 16 wherein the transaction data comprises location information and said merchant data comprises service information corresponding to the location.

* * * * *